US010527716B2

(12) United States Patent
Stein et al.

(10) Patent No.: US 10,527,716 B2
(45) Date of Patent: Jan. 7, 2020

(54) RANGING METHOD AND APPARATUS

(71) Applicant: Technische Universitat München, Munich (DE)

(72) Inventors: Manuel Stein, Munich (DE); Sebastian Theiler, Munich (DE); Josef A. Nossek, Iffeldorf (DE)

(73) Assignee: Technische Universität München, Munich (DE)

( * ) Notice: Subject to any disclaimer, the term of this patent is extended or adjusted under 35 U.S.C. 154(b) by 0 days.

(21) Appl. No.: 15/557,381

(22) PCT Filed: Mar. 11, 2016

(86) PCT No.: PCT/EP2016/055380
§ 371 (c)(1),
(2) Date: Sep. 11, 2017

(87) PCT Pub. No.: WO2016/142546
PCT Pub. Date: Sep. 15, 2016

(65) Prior Publication Data
US 2018/0246195 A1    Aug. 30, 2018

(30) Foreign Application Priority Data

Mar. 11, 2015  (DE) .................. 10 2015 103 605

(51) Int. Cl.
*G01S 11/02* (2010.01)
*G01S 19/39* (2010.01)
(Continued)

(52) U.S. Cl.
CPC ............. *G01S 11/02* (2013.01); *G01S 5/0294* (2013.01); *G01S 13/68* (2013.01); *G01S 13/72* (2013.01); *G01S 19/39* (2013.01); *G01S 19/42* (2013.01)

(58) Field of Classification Search
CPC ........ G01S 5/0294; G01S 11/02; G01S 13/68; G01S 13/72; G01S 19/39; G01S 19/42
See application file for complete search history.

(56) References Cited

U.S. PATENT DOCUMENTS

2003/0034887 A1*  2/2003  Crabtree .................. G01S 3/54
                                                                340/539.1
2006/0291537 A1* 12/2006  Fullerton .............. G01S 7/4052
                                                                375/145
(Continued)

OTHER PUBLICATIONS

Rife, Jason H., "Simultaneous Position Estimation & Ambiguity Resolution (SPEAR) for High-Integrity Carrier-Phase Navigation with Robustness to Tracking Loss", 2014 IEEE/Ion Position, Location and Navigation Symposium—Plans 2014, IEEE, May 5, 2014, pp. 692-700.

(Continued)

*Primary Examiner* — Ankur Jain
(74) *Attorney, Agent, or Firm* — Budzyn IP Law, LLC

(57) ABSTRACT

The present invention relates to a method of determining a distance or location of a remote device or reflector, the method comprising: receiving a signal from a remote signal transmitter associated with or contained in or attached to the remote device; estimating a first propagation delay associated with the received signal, wherein the first propagation delay represents a first candidate for a correct propagation delay; deriving a relationship between the first candidate and one or more other candidates for a correct propagation delay from the received signal; determining a plurality of other candidates for a correct propagation delay based on said relationship; generating a likelihood histogram based on said candidates for a correct propagation delay; selecting a propagation delay from said candidates based on the likelihood histogram; and determining a distance or location of the remote device or reflector using the selected propagation delay.

12 Claims, 12 Drawing Sheets

(51) Int. Cl.
*G01S 19/42* (2010.01)
*G01S 5/02* (2010.01)
*G01S 13/68* (2006.01)
*G01S 13/72* (2006.01)

(56) References Cited

U.S. PATENT DOCUMENTS

2010/0109903 A1\* 5/2010 Carrick .................. G01S 5/14
340/8.1
2010/0190509 A1\* 7/2010 Davis ................ H04W 56/006
455/456.1

OTHER PUBLICATIONS

Teunissen, P.J.G., "Statistical GNSS Carrier Phase Ambiguity Resolution: A Review", Statistical Signal Processing, 2001, Proceedings of the 11th IEEE Signal Processing Workshop on Aug. 6-8, 2001, Piscataway, NJ, USA, Aug. 3, 2001, pp. 4-12.
Wang, Na et al, "Particle Filter for HoRF Radar Range Ambiguity Resolving in Clutters", IET International Radar Conference 2013, Apr. 16, 2013, pp. 0419-0419.
International Search Report from PCT application No. PCT/EP2016/055380 dated Jul. 11, 2016.

\* cited by examiner

RANGING METHOD AND APPARATUS

CROSS-REFERENCE TO RELATED APPLICATIONS

This application is a National Stage Application under 35 U.S.C. § 371 of PCT Application No. PCT/EP2016/055380, filed Mar. 11, 2016, which claims priority to German Patent Application No. 102015103605.3, filed Mar. 11, 2015, the entire disclosures of which are hereby incorporated by reference.

BACKGROUND OF THE INVENTION

Ranging at high accuracy is a core problem in many technical fields. For example, high precision ranging can increase efficiency and productivity in agriculture by using robots for pruning, weeding and crop-spraying. In marine navigation, ranging with high accuracy can help to enter a port with big ships. Also the landing phase of an airplane can be automated by reliable high precision ranging techniques.

Ranging with radio systems is usually performed by measuring the propagation delay of an electro-magnetic wave with known structure. If the radio signal is transmitted on a high carrier frequency, it is understood that the carrier phase conveys significant information about the delay parameter. However, as the mapping between phase and delay parameter is ambiguous, it is believed that the carrier phase can only be exploited by combining measurements attained with different signal sources.

In the application of satellite-based synchronization and navigation (GPS, GLONASS, Galileo, etc.), high precision is therefore achieved by performing three independent steps, as illustrated in FIG. 1. An acquisition algorithm delivers some initial knowledge about the range between transmitter 1 and the receiver for all available transmitters l=1, ..., L. Here this initial knowledge is characterized by a Gaussian random variable with mean $\mu_{init}^{(l)}$ and variance $\sigma_{init}^2$. For each transmitter an individual tracking module then measures and tracks the baseband delay and the carrier phase of the radio signal as independent parameters. In practice, this is done with two control loops, the delay-locked loop (DLL) and the phase-locked loop (PLL). With the DLL only a coarse ranging solution can be obtained. The carrier phase $\zeta^{(l)}$ can be measured with much higher precision. However, the carrier phase is periodic with $2\pi$ and the measurement $\zeta^{(l)}$, is, thus, only given by some fraction of a cycle, i.e. the integer number $\Psi^{(l)}$ of whole cycles is not known at the receiver $$\hat{\zeta}^{(l)} = \omega_c \tau^{(l)} + 2\pi\Psi^{(l)} + e_\zeta^{(l)}, \zeta^{(l)} = \omega_c \tau^{(l)} + 2\pi\Psi^{(l)} + e_\zeta^{(l)},$$

where $$w_c = 2\pi f_c$$

is the carrier frequency, $$\tau^{(l)} = \frac{r^{(l)}}{c}$$

is the propagation-delay, c velocity of light and $e_\zeta^{(l)}$ the measurement error. Resolving the integer $\Psi^{(l)}$ precisely with measurements from one transmitter is not possible. Measurements from multiple transmitters and multiple time instances must be combined in order to resolve the ambiguity problem and obtain a ranging solution with high accuracy.

Approaches pertaining to the technological background of the present invention are described in the following references:

[1] G. Seco-Granados, J. A. Lopez-Salcedo, D. Jumenez-Baños and G. Lopez-Risueño, "Challenges in Indoor Global Navigation Satellite Systems," IEEE Signal Processing Magazine, vol. 29, no. 2, pp. 108-131, 2012.

[2] P. Misra and P. Enge, "Global Positioning System—Signals, Measurements, and Performance", Second Edition, Ganga-Jamuna Press, 2006.

[3] G. Blewitt, "Carrier Phase Ambiguity Resolution for the Global Positioning System Applied to Geodetic Baselines up to 2000 km," Journal of Geophysical Research, vol. 94, no. B8, pp. 10187-10203, 1989.

[4] P. Teunissen, "Least-Squares Estimation of the Integer GPS Ambiguities", Invited lecture, Section IV "Theory and Methodology," Proc. Of Gen. Meet. of the Int. Assoc. of Geodesy, Bejing, China, pp. 1-16, 1993.

[5] P. Teunissen, "A new method for fast carrier phase ambiguity estimation," Proc. of IEEE Pos., Loc. and Symp. (PLANS), Las Vegas, USA, pp. 562-573, 1994.

[6] P. Teunissen, "The least-squares ambiguity decorrelation adjustment: a method for fast GPS ambiguity estimation," Journal of Geodesy, vol. 70, pp. 65-82, 1995.

[7] P. Teunissen, "Statistical GNSS carrier phase ambiguity resolution: A review," Proc. of the l-th IEEE Workshop of Statistical Signal Processing (SSP), pp. 4-12, 2001.

[8] C. Günther, P. Henkel, "Integer Ambiguity Estimation for Satellite Navigation," IEEE Transactions on Signal Processing, vol. 60, no. 7, pp. 3387-3393, 2012.

[9] S. M. Kay, "Fundamentals of Statistical Signal Processing: Estimation Theory," Pretice Hall, 1993.

[10] B. Ristic, S. Arulampalam and N. Gordon, "Beyond the Kalman Filter—Particle Filters for Tracking Applications," Artech House Inc., 2004.

[11] A. Doucet and A. Johansen, "A Tutorial on Particle Filtering and Smoothing: Fifteen Years later," Oxford Handbook of Nonlinear Filtering, Oxford University Press, 2011.

[12] A. Kong, J. Liu and W. Wong, "Sequential imputations and Bayesian missing data problems," Journal of the American Statistical Association, vol. 89, no. 425, pp. 278-288, 1994.

[13] A. Doucet, S. Godsill and C. Andrieu, "On sequential Monte Carlo sampling methods for Bayesian filtering," Statistics and Computing, vo. 10, pp. 197-208, 2000.

[14] N. J. Gordon, D. J. Salmond and A. F. M. Smith, "Novel approach to nonlinear/non-Gaussian Bayesian state estimation," IEE Proc. F Radar Signal Process., vol. 140, no. 2, pp. 107-113, 1993.

[15] T. Li, T. P. Sattar, Q. Han and S. Sun, "Roughening Methods to Prevent Sample Impoverishment in the particle PHD filter," 16th International Conference on Information Fusion (FUSION), 2013.

[16] K. Borre, D. M. Akos, N. Bertelsen, P. Rinder, S. H. Jensen, A Software-Defined GPS and Galileo Receiver: A Single-Frequency Approach, Birkhäuser Boston, 2007.

[17] M. Simandl, J. Kralovec, P. Tichavsky, "Filtering, Predictive, and Smoothing Cram'er-Rao Bounds for Discrete-time Nonlinear Dynamic Systems", Automatica, vol. 37, no. 11, pp. 1703-1716, 2001.

[18] H. L. Van Trees, K. L. Bell, "Bayesian Bounds for Parameter Estimation and Nonlinear Filtering/Tracking," lth ed. Piscataway, N.J.: Wiley-IEEE Press, 2007.
[19] P. Misra and P. Enge, "Global Positioning System—Signals, Measurements, and Performance", Second Edition, Ganga-Jamuna Press, 2006.
[20] B. Ristic, S. Arulampalam and N. Gordon, "Beyond the Kalman Filter—Particle Filters for Tracking Applications," Artech House Inc., 2004.

The present invention aims to solve the above mentioned problems. In particular, the present invention aims to provide a method and apparatus that provides robust ranging at high accuracy and high processing rate.

SUMMARY OF THE INVENTION

The present invention is recited in the independent claims. Optional features are recited in the sub-claims.

In an embodiment, the present invention enables to exploit the carrier phase information directly, i.e. to resolve the ambiguity problem directly and independently for each signal source in a tracking module. To this end, the noise-free part of the receive signal is modelled as an exact function of the propagation delay. In particular, the dependency between the carrier phase and the delay parameter is taken into account in an explicit way. Additionally, a statistical model for the temporal evolution of the delay parameter is used to align a tracking algorithm to the grid of possible delay solutions. Over subsequent observation blocks then a long integration ambiguity histogram (LIAH) is constructed with the likelihood function evaluated on the ambiguity grid. This allows to resolve the ambiguity issue and to output a precise unbiased measurement of the delay parameter. The potential of this approach can be demonstrated within a Global Navigation Satellite System (GNSS) scenario where each millisecond it becomes possible to measure the range between a fast moving satellite and a GPS receiver with millimeter accuracy. The present invention is not limited to a GPS application and may also be implemented, for example, in FMCW radar positioning.

In another embodiment, the present invention demonstrates that it is possible to combine carrier and baseband information at the physical layer in order to obtain an ultra-precise and unambiguous time-delay estimate with a single narrowband transmit signal. To this end, a precise observation model is derived and side-information about the temporal evolution of the delay process is taken into account. By applying a Bayesian error bound, the present invention explores the fundamental performance limit for delay estimation with the established models. In order to make this theoretic accuracy accessible at moderate complexity, a two-step approximation of the optimum tracking algorithm is formulated. The presented estimation theoretic analysis and the Monte-Carlo simulations of the developed algorithm according to the present invention show that it is possible to increase the ranging and synchronization accuracy of wireless systems by a factor of 100.

BRIEF DESCRIPTION OF THE DRAWINGS

Embodiments of the invention are now described with reference to the accompanying drawings in which.

DESCRIPTION OF EMBODIMENTS OF THE INVENTION

Figure 1:
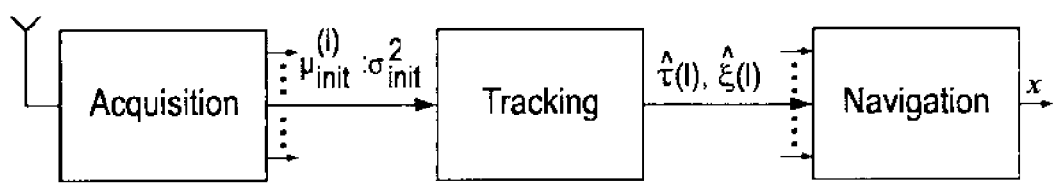
FIG. 1 is an illustration of a convention positioning system.
Figure 2:
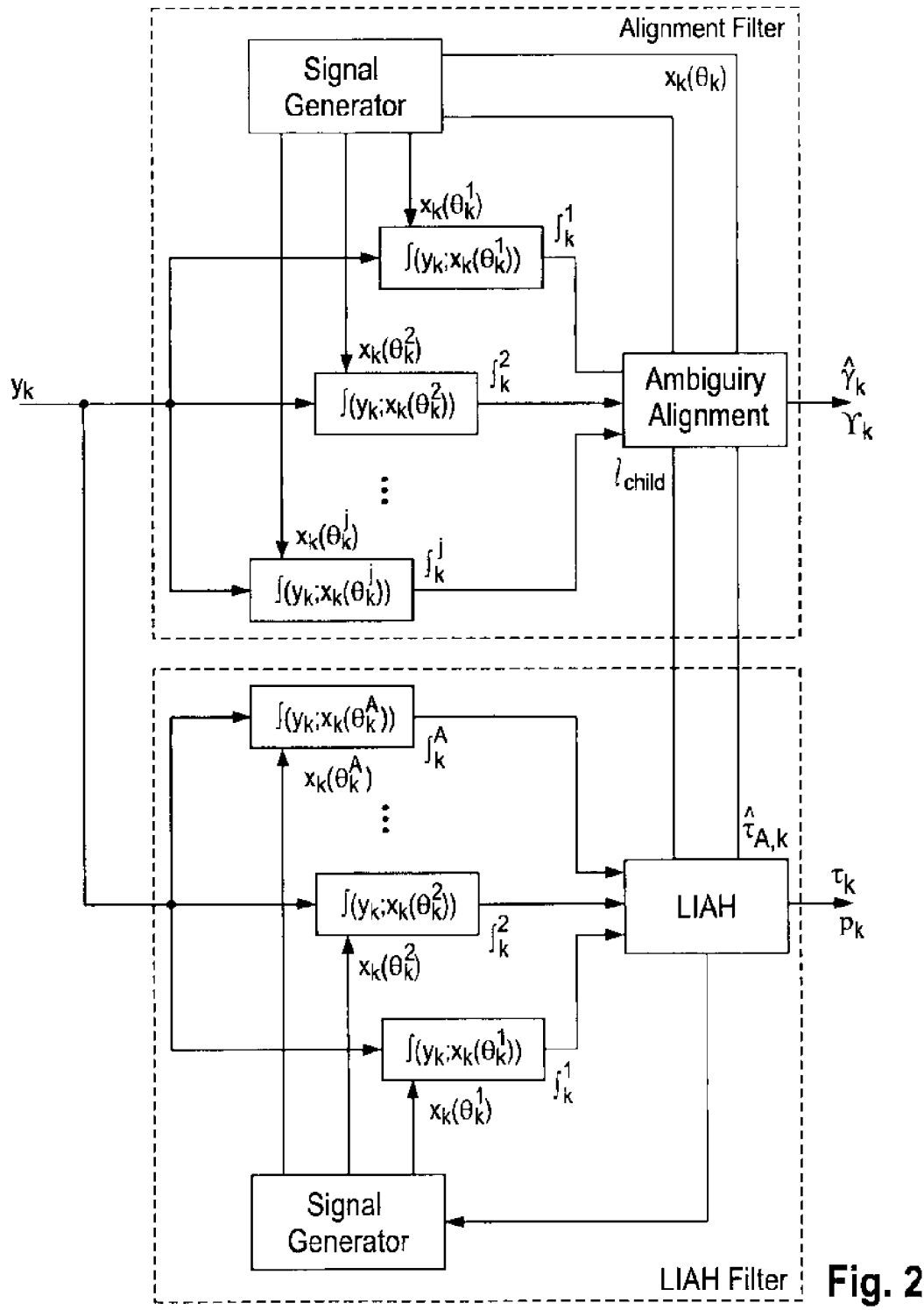
FIG. 2 is a flow chart illustrating the steps performed by a tracking module with LIAH in accordance with an embodiment of the present invention.

An embodiment is described which allows a receive device to measure precisely and unambiguously the time-delay of a radio wave signal with known structure s(t) and carrier frequency $\omega_c$. The procedure is performed in the digital domain, i.e. the receive device preprocesses the analog receive sensor signal by a radio front-end consisting of amplifiers, filters, two mixers and two samplers.

Brief Description of an Embodiment

Signal Model

The two sampling devices operate at a frequency $$f_s = \frac{1}{T_c}..$$

Within a time period of $T=NT_s$, which is referred to as the duration of one processing block, a buffering device collects $N=T/T_s$ samples from each digital output of the radio front-end. Therefore in the k-th processing block the digital data $$y_k = \begin{bmatrix} y_{k,1} \\ \vdots \\ y_{k,N} \end{bmatrix}$$

$$= \gamma_k \begin{bmatrix} x_{k,1}(\theta_k) \\ \vdots \\ x_{k,N}(\theta_k) \end{bmatrix} + \begin{bmatrix} n_{k,1} \\ \vdots \\ n_{k,N} \end{bmatrix}$$

$$= \gamma_k x_k(\theta_k) + n_k$$

$$=\gamma_k x_k(\theta_k)+n_k$$

is available, where $$y_{k,n}=\gamma_k x_{k,n}(\theta_k)+n_{k,n}$$

are the two samples at each sampling instance, in the following referred to as snapshot. Each snapshot contains the sampled version of the received radio wave $$x_{k,n}(\theta_k) = T(\tau_k) d_n(v_k) s_{k,n}(\tau_k, v_k),$$

scaled by the signal attenuation $\gamma_k$, with the matrix $$T(\tau_k) = \begin{bmatrix} \cos(\omega_c \tau_k) & \sin(\omega_c \tau_k) \\ -\sin(\omega_c \tau_k) & \cos(\omega_c \tau_k) \end{bmatrix},$$

due to the propagation delay $\tau_k$ and the carrier frequency $\omega_c$ of the radio wave from the transmitter to the receiver and a vector $$d_n(v_k) = \begin{bmatrix} \cos(\omega_c v_k (n-1) T_s) \\ -\sin(\omega_c v_k (n-1) T_s) \end{bmatrix},$$

due to the rate of change $v_k$ of the propagation delay (relative velocity between transmitter and receiver). The signal $s^{s_{k,n}(\tau_k, v_k)}$ is the sampled version of the transmitted baseband wave s(t). The snapshot component $n_{k,n}$ is independent additive random noise with covariance $$E[n_{k,n} n_{k,n}^T] = I_2.$$

For brevity of notation, the signal parameters (delay and velocity) are summarized in vector notation $$\theta_k = [\tau_k v_k]^T.$$

The temporal evolution of the two parameters (delay and velocity) over subsequent processing blocks follows an autoregressive model of first order $$\theta_{k+1} = \begin{bmatrix} \tau_{k+1} \\ v_{k+1} \end{bmatrix} = F \theta_k + z_k,$$

where the process matrix is $$F = \begin{bmatrix} 1 & T \\ 0 & 1 \end{bmatrix}$$

and $z_k$ is additive process noise with the covariance matrix $$E[z_k z_k^T] = \sigma_z^2 \begin{bmatrix} \frac{T^2}{3} & \frac{T^2}{2} \\ \frac{T^2}{2} & T \end{bmatrix}.$$

Precise Time-Delay Measurement with LIAH

The aim of the receiver is to output accurate measurements (estimates) of the signal parameters $\hat{\gamma}_k$, $\hat{\tau}_k$ and $\hat{v}_k$ for a large number K of subsequent processing blocks. As accurate estimates of $\hat{\tau}_k$ exhibit a strong ambiguity the procedure contains a tracking module (ambiguity alignment) and an ambiguity resolution module (LIAH). The two modules perform individual steps and exchange information within each processing block.

Ambiguity Alignment Filter

The alignment filter provides the estimates $\hat{\gamma}_k$ and $\hat{v}_k$ and produces an alignment center estimate $\hat{\tau}_{A,k}$, which allows to deduce the grid of possible ambiguous solutions for $\hat{\tau}_k$. In each block a signal generator produces replicas $x_k(\theta_k^1)$, $x_k(\theta_k^2)$, ..., $x_k(\theta_k^J)$ of the transmit signal for J different versions of the parameters $\theta_k$. The signal generator forwards the replicas to J calculation units. The signal generator also generates a replica $x_k(\hat{\theta}_k)$ and forwards it to the ambiguity alignment unit. The j-th unit performs the calculation $$\hat{\gamma}_k^j = \frac{y_k^T x_k(\theta_k^j)}{x_k^T(\theta_k^j) x_k(\theta_k^j)} \text{ and}$$

$$f(y_k; x_k(\theta_k^j)) = \frac{1}{2}(y_k - \hat{\gamma}_k^j x_k(\theta_k^j))^T (y_k - \hat{\gamma}_k^j x_k(\theta_k^j)) = f_k^j.$$

The calculation result $f_k^j$ is forwarded to the alignment unit. The alignment unit holds J weighting $w_k^j$ factors. With the calculations $f_k^j$ the weightings are updated $$w_k^j = w_{k-1}^j \exp(-f_k^j)$$

and subsequently normalized such that $$\sum_{j=1}^{J} w_k^j = 1.$$

The tracking estimates are calculated $$\hat{\tau}_{A,k} = \sum_{j=1}^{J} w_k^j \tau_k^j$$

$$\hat{v}_k = \sum_{j=1}^{J} w_k^j v_k^j.$$

The effective filter size $$J_{eff} = \frac{1}{\sum_{j=1}^{J} w_k^j}$$

is calculated. If $J_{eff} < \beta J$, a resampling step is performed, which recalculates the parameter points $\theta_k^1, \theta_k^2, \ldots, \theta_k^J$ by systematic resampling, adds roughening noise $$\theta_k^j = \theta_k^j + r_k^j$$

and sets $$w_k^j = \frac{1}{J}$$

for all j=1, 2, ..., J. Finally, the parameter points $\theta_k^1$, $\theta_k^2$, ..., $\theta_k^J$ are propagated by the process model $$\theta_{k+1}^j = F \theta_k^j + z_k^j$$

for all j=1, 2, ..., J. A prediction for the next block is produced by $$\bar{\theta}_{k+1} = \sum_{j=1}^{J} w_k^j \theta_{k+1}^j.$$

The estimates $\hat{\tau}_{A,k}$ and $\hat{v}_k$ are forwarded to the LIAH module. The attenuation estimate is calculated $$\hat{\gamma}_k = \frac{y_k^T x_k(\tilde{\theta}_k)}{x_k^T(\tilde{\theta}_k) x_k(\tilde{\theta}_k)}.$$

Initialization: For the initialization of the ambiguity alignment filter, i.e. for the first processing block k=0 the parameter points $\theta_0^1, \theta_0^2, \ldots, \theta_0^J$ are initialized by $$\tau_0^j \sim \mathcal{U}_{[\mu_{init,\tau}-0.5\Delta, \mu_{init,\tau}+0.5\Delta]}$$

$$v_0^j \sim \mathcal{N}(\mu_{init,v}, \sigma_{init,v}^2),$$

where $\mu_{init,\tau}$ and $\mu_{init,v}$ are the estimates of an acquisition algorithm and $\sigma_{init,v}$ is the standard deviation of the algorithm with respect to the velocity. $\Delta$ is proportional to half the carrier wave-length $$\Delta = \frac{\pi}{\omega_c}.$$

The weighting factors are initialized $$\omega_0^j = \frac{1}{J}$$

for all j=1, 2, ..., J and the prediction for the first block is produced by $$\tilde{\theta}_1 = \frac{1}{J} \sum_{j=1}^{J} \theta_0^j.$$

Shift Event: If the LIAH filter triggers the shift event and provides a shift $l_{shift}$, all parameter versions are shifted such that $$\tau_k^j \leftarrow \tau_k^j + l_{shift}\Delta.$$

LIAH Filter

The long integration ambiguity histogram (LIAH) filter provides an likelihood histogram $p_k$ on the grid of possible ambiguous solutions for $\hat{\tau}_k$. In each block a signal generator produces replicas of the transmit signal $$x_k(\theta_k^1), x_k(\theta_k^2), \ldots, x_k(\theta_k^A)$$

with A (A is an odd number) different versions of the parameters $$\theta_k^a = [\alpha_{k,a}\Delta + \hat{\tau}_{A,k}, \hat{v}_k]^T$$

where $\alpha_k \in \mathbb{Z}^{A\times 1}$ is a vector containing the number of intervals $\Delta$ between the ambiguity grid point a and the alignment center point $\hat{\tau}_{A,k}$. The signal generator forwards the replicas to A calculation units. The $\alpha$-th unit performs the calculation $$\hat{\gamma}_k^a = \frac{y_k^T x_k(\theta_k^a)}{x_k^T(\theta_k^a) x_k(\theta_k^a)}$$

and

-continued $$f(y_k; x_k(\theta_k^a)) = \frac{1}{2}(y_k - \hat{\gamma}_k^a x_k(\theta_k^a))^T (y_k - \hat{\gamma}_k^a x_k(\theta_k^a))$$
$$= f_k^a.$$

The calculation result $f_k^\alpha$ is forwarded to the LIAH unit. The LIAH unit holds A histogram values $p_k^\alpha$. With the calculations $f_k^\alpha$ the histogram values are updated $$p_k^a = p_{k-1}^a \exp(-f_k^a)$$

and subsequently normalized such that $$\sum_{j=1}^{A} p_k^a = 1.$$

The delay estimate $\hat{\tau}_k$ is determined by $$\hat{\tau}_k = a_{k,a} * \Delta + \hat{\tau}_{A,k},$$

where $$a^* = \arg\max_{a \in \{1,\ldots,A\}} p_k^a.$$

The LIAH unit holds A counters $c_k^\alpha$. If a histogram value exceeds $p_k^\alpha > \rho$, where $$\frac{1}{A} < \rho < 1, c_k^a$$

is incremented by one. If $c_k^\alpha > C$ the filter triggers a shift event, sets all counters $c_k^\alpha$ to zero, resets the histogram $$p_k^a = \frac{1}{A}$$

and feedbacks the mitt $l_{shift}$ (number of intervals $\Delta$ between old and new alignment center) to the alignment filter.

Select Checked Ambiguities: The LIAH unit checks a set of A ambiguities within the delay interval $$[\hat{\tau}_{A,k} - A_{max}\Delta, \hat{\tau}_{A,k} + A_{max}\Delta].$$

Therefore, the checked positions on the ambiguity grid are $$\alpha_{k,a} = \text{round}\left(\left(-1 + (a-1)\frac{2}{A-1}\right) A_{max}\right).$$

Every time the shift event occurs the interval width is updated by $$A_{max} = \max\left(\chi, \frac{A-1}{2}\right)$$

with $$\chi = \max_{u,v \in \{1,\ldots,A\}} |\alpha_{k,u} - \alpha_{k,v}|$$

under the constraint $|u-v|=1$.

Initialize Checked Ambiguities: In the beginning of the procedure, i.e. k=0 the initialization is $$A_{max} = \max\left(\left\lceil \frac{\partial \sigma_{init,\tau}}{\Delta} \right\rceil, \frac{A-1}{2}\right)$$

with $\epsilon$ being a design parameter $\sigma_{init,\tau}$ and the standard deviation of the acquisition algorithm with respect to the delay parameter.

Integration into a Conventional Receiver

A possible approach to integrate the presented technique into a conventional receiver is to use a conventional DLL/PLL receiver as alignment filter. The DLL/PLL provides a carrier-phase measurement $\hat{\psi}k$ and a coarse time-delay estimate $\hat{\tau}_k$ from which an alignment center point can de deduced by solving $$\hat{l}_k = \arg\min_{l \in \mathbb{Z}} \left(\frac{\hat{\varphi}_k + l\pi}{\omega_c} - \hat{\tau}_k\right)^2$$

and setting $$\hat{\tau}_{A,k} = \frac{\hat{\varphi}_k + \hat{l}_k \pi}{\omega_c}.$$

Detailed Description of an Embodiment

Observation Model

Figure 4:
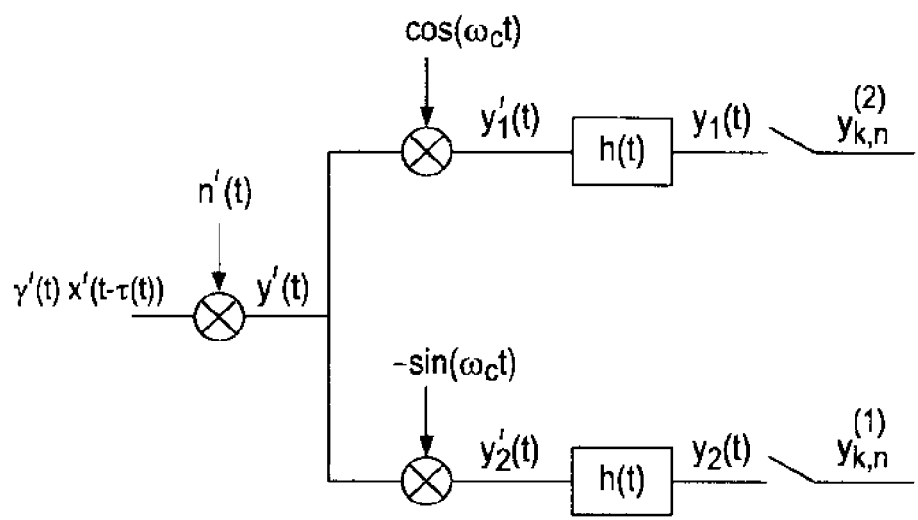
FIG. 4 a RF front-end for use with an embodiment of the present invention.

Consider a scenario with one radio transmitter and a receiver. The transmitter emits an electromagnetic wave of known periodic structure $$x'(t) = s'(t)\cos(\omega_c t),$$

where $s'(t) \in \mathbb{R}$ is a periodic baseband signal and $\omega_c$ is the carrier frequency. The power of the transmitted signal $x'(t)$ is assumed to be normalized $$\int_{-\infty}^{\infty} |X'(\omega)|^2 d\omega = 1,$$

where $|X'(\omega)|^2$ is the Fourier transform of the autocorrelation function of $x'(t)$. The signal at the receive sensor $$y'(t) = \gamma'(t)x'(t - \tau(t)) + n'(t)$$
$$= \gamma'(t)s'(t - \tau(t))\cos(\omega_c(t - \tau(t))) + n'(t).$$

is characterized by a time-dependent propagation delay $\tau(t) \in \mathbb{R}$ and an attenuation $\gamma'(t) \in \mathbb{R}$, while the additive random noise $n'(t)$ is assumed to have flat power spectral density (PSD) $\Phi'(\omega) = N_0$. The receive signal $y'(t)$ is demodulated with two orthogonal functions $$d_1(t) = \cos(\omega_c t)$$
$$d_2(t) = -\sin(\omega_c t)$$

oscillating at carrier frequency (see FIG. 4). The signals in the two demodulation channels can, hence, be written as $$y'_1(t) = y'(t)d_1(t)$$
$$= \gamma(t)s'(t - \tau(t))(\cos(\omega_c \tau(t)) +$$
$$\cos(2\omega_c t - \omega_c \tau(t))) + n'_1(t)$$

and $$y'_2(t) = y'(t)d_2(t)$$
$$= \gamma(t)s'(t - \tau(t))(-\sin(\omega_c \tau(t)) -$$
$$\sin(2\omega_c t - \omega_c \tau(t))) + n'_2(t),$$

where $$n'_i(t) = d_i(t)n'(t), i \in \{1, 2\},$$

and $$\gamma(t) = \frac{\gamma'(t)}{2}.$$

Note that $n'_1(t)$ and $n'_2(t)$ are uncorrelated, i.e. $E[n'_1(t)n'_2(t)] = 0, \forall t$. Moreover, the PSD of the additive white Gaussian noise components $n'_i(t)$ is given by $$\Phi_i(\omega) = \frac{N_0}{2}, i \in \{1, 2\}.$$

The ideal low-pass filters $h(t)$ of the two channels are assumed to have one-sided bandwidth B. The filtered analog signals can, thus, be written as $$y_1(t) = y'_1(t) * h(t)$$
$$= \gamma(t)s(t - \tau(t))\cos(\omega_c \tau(t)) + n_1(t)$$
$$y_2(t) = y'_2(t) * h(t)$$
$$= -\gamma(t)s(t - \tau(t))\sin(\omega_c \tau(t)) + n_2(t),$$

where $$s(t) = s'(t) * h(t)$$
$$n_i(t) = n'_i(t) * h(t), i \in \{1, 2\},$$

with * being the convolution operator. The signals of the two channels can be written in compact matrix-vector representation $$y(t) = \begin{bmatrix} y_1(t) \\ y_2(t) \end{bmatrix} = \gamma(t)b(\tau(t))s(t; \tau(t)) + n(t)$$

with $$s(t; \tau(t)) = s(t - \tau(t))$$
$$n(t) = [n_1(t) \; n_2(t)]^T$$

and $$b(\tau(t)) = [\cos(\omega_c \tau(t)) \; -\sin(\omega_c \tau(t))]^T.$$

After filtering, the analog signals are sampled at a rate of $$f_s = \frac{1}{T_s}.$$

In the following one observation block consists of N samples from each channel, i.e. $y_k \in \mathbb{R}^{2N}$ is the observation in block k. The time-delay process is assumed to be approximately linear within one block $$\tau(t) \approx \tau_k + \nu_k(t - t_k), t \in [t_k; t_k + NT_s),$$

where $\tau_k$ is the time-delay of the first sample in block k and $v_k$ is the relative velocity (normalized by speed of light c) between receiver and transmitter in block k. The signal strength $\gamma(t)$ is assumed to be constant over one block $$\gamma(t)=\gamma_k, t\in[t_k;t_k+NT_s).$$

For brevity of notation, the two parameter vectors $$\theta'_k=[\tau_k v_k \gamma_k]^T$$

$$\theta_k=[\tau_k v_k]^T$$

are introduced. The n-th sample in the k-th block is given by $$y_{k,n} = \begin{bmatrix} y_{k,n}^{(1)} \\ y_{k,n}^{(2)} \end{bmatrix} = \begin{bmatrix} x_{k,n}^{(1)}(\theta'_k) \\ x_{k,n}^{(2)}(\theta'_k) \end{bmatrix} + \begin{bmatrix} n_{k,n}^{(1)} \\ n_{k,n}^{(2)} \end{bmatrix}$$
$$= x_{k,n}(\theta'_k) + n_{k,n}$$
$$= \gamma_k b_n(\theta_k) s_{k,n}(\theta_k) + n_{k,n}$$

with $$s_{k,n}(\theta_k) = s(t_k + (n-1)T_s - \tau_{k,n}(\theta_k))$$

$$n_{k,n} = \begin{bmatrix} n_1(t_k + (n-1)T_s) \\ n_2(t_k + (n-1)T_s) \end{bmatrix}$$

and $$b_n(\theta_k) = [\cos(\omega_c \tau_{k,n}(\theta_k)) \quad -\sin(\omega_c \tau_{k,n}(\theta_k))]^T,$$

where $\tau_{k,n}$ is the delay of the n-th sample in the k-th block $$\tau_{k,n}(\theta_k)=\tau_k+v_k(n-1)T_s.$$

The vector $b_n(\theta_k)$ can be decomposed $$b_n(\theta_k)=T(\tau_k)d_n(v_k)$$

into a matrix $$T(\tau_k) = \begin{bmatrix} \cos(\omega_c \tau_k) & \sin(\omega_c \tau_k) \\ -\sin(\omega_c \tau_k) & \cos(\omega_c \tau_k) \end{bmatrix},$$

which only depends on the delay parameter $\tau_k$ and a vector $$d_n(v_k) = \begin{bmatrix} \cos(\omega_c v_k(n-1)T_s) \\ -\sin(\omega_c v_k(n-1)T_s) \end{bmatrix},$$

which only depends on the relative velocity $v_k$. The receive signal can, thus, be modeled as $$x_{k,n}(\theta'_k)=\gamma_k T(\tau_k) d_n(v_k) s_{k,n}(\theta_k).$$

The vector of one observation block $y_k$ is defined as $$y_k = \begin{bmatrix} y_{k,1} \\ \vdots \\ y_{k,N} \end{bmatrix} = \begin{bmatrix} x_{k,1}(\theta'_k) \\ \vdots \\ x_{k,N}(\theta'_k) \end{bmatrix} + \begin{bmatrix} n_{k,1} \\ \vdots \\ n_{k,N} \end{bmatrix}$$
$$= x_k(\theta'_k) + n_k.$$

The noise $n_k$ is assumed to be uncorrelated. Hence, the noise covariance matrix is given as $$R=E[n_k n_k^T]=BN_0 I_{2N},$$

where $I_{2N}$ is the identity matrix of dimension 2N.

ML Estimation with a Single Block

The receiver is interested in estimating the parameters of the receive signal in order to gain information about the propagation channel between transmitter and receiver. Using only one observation block for estimation, the maximum likelihood (ML) estimator is the best unbiased estimator. The ML estimator is attained by solving the optimization $$\hat{\theta}'_k = \arg \max_{\theta' \in \Theta'} f'_{ML}(y_k; \theta'_k),$$

where $$f'_{ML}(y_k; \theta'_k) = p_y(y_k | \theta'_k)$$

and $$p_y(y_k | \theta'_k) = \frac{e^{\left(-\frac{1}{2BN_0}(y_k - x_k(\theta'_k))^T(y_k - x_k(\theta'_k))\right)}}{(2\pi BN_0)^N}.$$

The ML estimate for the signal $\gamma_k$ strength can be computed in closed form as a function of $\theta_k$ and is given by $$\hat{\gamma}_k(\theta_k) = \frac{\sum_{n=1}^{N} y_{k,n}^T T(\tau_k) d_n(v_k) s_{k,n}(\theta_k)}{\sum_{n=1}^{N} (s_{k,n}(\theta_k))^2}.$$

Substituting $\gamma_k$ in the ML function results in a compact version $$f_{ML}(y_k; \theta_k) = \frac{\left(\sum_{n=1}^{N} y_{k,n}^T T(\tau_k) d_n(v_k) s_{k,n}(\theta_k)\right)^2}{\sum_{n=1}^{N} (s_{k,n}(\theta_k))^2}$$

and the problem can be reformulated $$\hat{\theta}_k = \arg \max_{\theta \in \Theta} f_{ML}(y_k; \theta_k).$$

Figure 5:
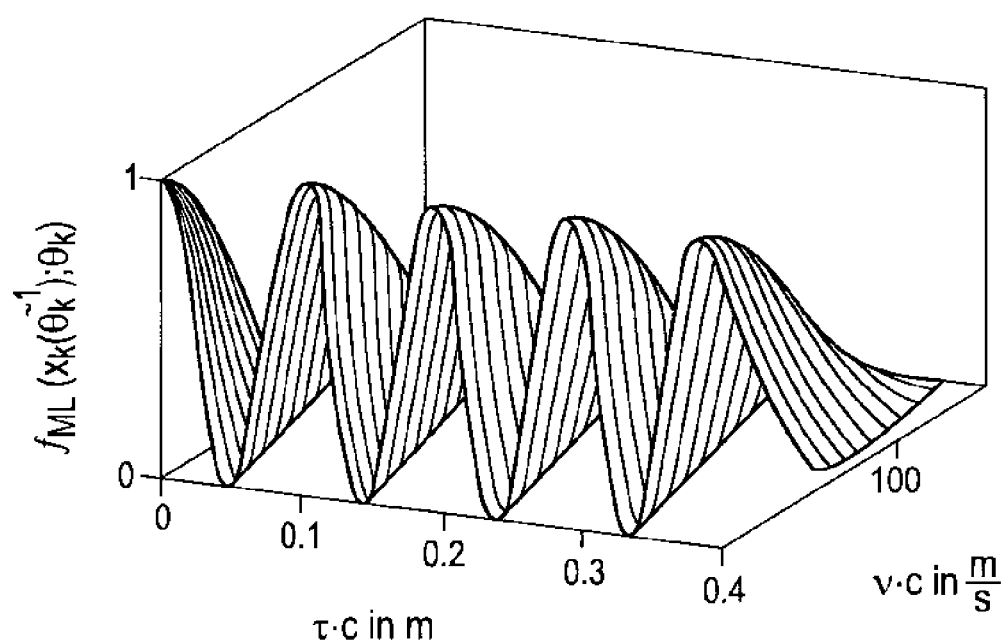
FIG. 5 illustrates a maximum likelihood (ML) function generated in a method in accordance with an embodiment of the present invention.

Note that only the maximization with respect to $\tau_k$ and $v_k$ is required, while the ML estimate for $\gamma_k$ can be computed in closed form with the solution $\hat{\theta}_k$. In FIG. 5, the normalized noise-free ML function $f_{ML}(x_k(\hat{\theta}'_k); \theta_k)$ with $\hat{\theta}'_k=[0\ 0\ 1]^T$ is plotted. A GPS-signal (C/A L1, Sat. 1)

$$s'(t) = \sum_{m=-\infty}^{\infty} [b]_{\mod(m,M)} g(t - mT_C)$$

with block length N=2046 and chip duration Ct=977.53 ns is used, where b∈{−1, +1} is a sequence of M=1023 binary symbols, each of duration $T_C$, mod$^{(\cdot)}$ is the modulo operator and g(t) is a bandlimited transmit pulse. The carrier frequency is given as $f_c$=1575.42 MHz. The one-sided bandwidth of the ideal low-pass filter at the receiver is equal to B=$T_C^{-1}$=1.023 MHz: The sampling frequency is chosen according to the sampling theorem $f_s$=2B=2.046 MHz. The ML function is plotted in a range from 0 m to 0.4 m in $\tau_k$-direction. There is no clear global maximum within this range, however, there are many local maxima. The distance between two neighboring maxima is half the wavelength $$\Delta = \frac{z}{2f_c} = 0.0951$$

m as the sign or the signal amplitude is not known at the receiver.

As the height of the local maxima decays slowly in the direction of $\tau_k$, the multi-modal shape of the ML function makes estimation with one observation block impossible.

The idea of the following sections is to resolve this ambiguity issue with the help of an likelihood histogram which is constructed over a long integration time.

Nearly Constant Velocity Model

In order to realize a long integration time within a dynamic scenario, the temporal evolution of the channel parameters has to be modeled precisely. Here an autoregressive model of first order is used $$\theta_{k+1} = \begin{bmatrix} \tau_{k+1} \\ v_{k+1} \end{bmatrix} = F\theta_k + \omega_k,$$

where the matrix $F \in \mathbb{R}^{2 \times 2}$ is the process matrix and $w_k$ is additive process noise with the covariance matrix $$E[\omega_k \omega_k^T] = Q \in \mathbb{R}^{2 \times 2}.$$

This simple model turns out to be quiet accurate for practical GNSS scenarios. A meaningful assumption for practical scenarios is that the first derivative $\dot{\tau}(t)$ of the continuous time-delay process $\tau(t)$ given in (19) is nearly constant over the duration of one block. Consequently, higher order derivatives are almost equal to zero and the second order derivative $\ddot{\tau}(t)$ can be modeled as a zero mean white noise process $\ddot{\tau}(t) = w(t)$ with $$E[\omega(t)\omega(t')] = \sigma_w^2 \delta(t - t').$$

The process matrix F is then given as $$F = \begin{bmatrix} 1 & T \\ 0 & 1 \end{bmatrix}.$$

where $T = t_{k+1} - t_k$ is the duration of one block, i.e. $T = NT_s$ and the covariance matrix Q as $$Q = \sigma_\omega^2 \begin{bmatrix} \frac{T^3}{3} & \frac{T^2}{2} \\ \frac{T^2}{2} & T \end{bmatrix}.$$

Precise Delay Estimation with Ambiguity Resolution

Apart from the observation model and the process model, the prior knowledge from the acquisition algorithm is assumed to be Gaussian, i.e. $\tau_1 \sim N(\mu_{init,\tau}, \sigma_{init,\tau}^2)$ and $v_1 \sim N(\mu_{init,v}, \sigma_{init,\tau}^2)$. Combining all available information, it is possible to estimate and track the time-delay process $\tau(t)$ with very high accuracy. The proposed low complexity estimation process consists of two steps for each block. The first step estimates and tracks one arbitrary time-delay ambiguity $\hat{\tau}_{A,k}$ (i.e., a first candidate for a correct propagation delay) with a particle filter (PF). Moreover, an estimate for the relative velocity $\hat{v}_k$ is provided. The second step exploits the structural information of the likelihood function by updating a likelihood histogram formed on a subset of points on the ambiguity grid $A_k$. Based on this long integration ambiguity histogram (LIAH) the algorithm finally decides for the most probable time-delay solution $\hat{\tau}_k$ from a plurality of candidates for a correct propagation delay.

Ambiguity Grid Alignment with a Particle Filter

The optimal estimator for the considered estimation problem is the conditional mean estimator (CME). Since the observation model shows severe non-linearities, the CME cannot be stated in closed form. Hence, suboptimal approaches need to be used. An estimation method, which approximates the CME and is able to handle strong non-linearities, is particle filtering. Note that the PF is identical to the CME only for an infinite number of particles. However, a large number of particles results in high computational complexity. In order to guarantee a correct and precise delay-estimation with a small number of particles, step 1 only focuses on finding one arbitrary ambiguity. Therefore, the particles are initialized $$\tau_1^j \sim \mathcal{U}[\mu_{init,\tau} - 0.5\Delta, \mu_{init,\tau} + 0.5\Delta]$$

$$v_1^j \sim N(\mu_{init,v}, \sigma_{init,v}^2)$$

for $j=1, \ldots, J$, where J is the number of used particles. Note that the time-delay particles are initialized uniformly in the range of one ambiguity. With this initialization, it is possible to estimate and track one ambiguity with high accuracy. The weight $w_k^j$ of particle j is updated $$w_k^j \propto w_{k-1}^j p \, \mathcal{Y}(\mathcal{Y}_k | \theta_k^j, \hat{\gamma}_k(\theta_k^j))$$

exploiting the observation $\mathcal{Y}_k$ of block k. Note that the weights are initialized uniformly, i.e.

$$\omega_0^j = \frac{1}{j}$$

and are normalized in every step such that $\Sigma_{j=1}^J w_k^j = 1$. The tracking estimates are $$\hat{\tau}_{vA,k} = \sum_{j=1}^J \omega_k^j \tau_k^j$$

$$\hat{v}_k = \sum_{j=1}^J \omega_k^j v_k^j.$$

In every block the effective sample size $$J_{\text{eff}} = \frac{1}{\sum_{j=1}^J \omega_k^j}$$

is computed. If $J_{\text{eff}} < 0.5 * J$, a resampling and roughening step is needed to guarantee the stability of the PF. Here systematic resampling is used. The process model is used to update the particles $$\theta_{k+1}^j = F\theta_k^j + w_k^j, j \in \{1, \ldots, J\}.$$

Ambiguity Resolution with LIAH

In the second step the structural information of the likelihood function is exploited. As the distance $\Delta$ between two neighboring ambiguities is known, the positions of all ambiguities, referred to as the ambiguity grid $A_k$, can be estimated from $\hat{\tau}_{A,k}$. In the following the algorithm only considers the ambiguities within the interval $$[\hat{\tau}_{A,k} - \epsilon\sigma_{init,\tau}, \hat{\tau}_{A,k} + \epsilon\sigma_{init,\tau}].$$

Note that there is a trade-off between complexity and reliability which needs to be taken into account when choosing the design parameter $\epsilon$. The probability that the true ambiguity, i.e. the time-delay $\tau_k$ is within the interval $$[\mu_{init,\tau}-\epsilon\sigma_{init,\tau},\mu_{init,\tau}+\epsilon\sigma_{init,\tau}]$$

can be computed with the initial knowledge of the acquisition. The core part of the presented delay estimation process consists of different stages. In every stage the likelihood of a fixed number $A \geq 5$ of ambiguities out of the grid $A_k$ is tested. Without loss of generality, A is assumed to be odd. Within one stage the algorithm decides for one of the A ambiguities. The search is refined in the next stage. The A ambiguities for the first stage are $$a_k^i = \text{round}\left(\left(-1+(i-1)\frac{2}{A-1}\right)a_{max}\right)$$

with round$^{(\cdot)}$ being the rounding operator, $i \in \{1, \ldots, A\}$ and $$a_{max} = \max\left(\left\lceil\frac{\partial \sigma_{init,\tau}}{\Delta}\right\rceil, \frac{A-1}{2}\right),$$

where $\lceil\ \rceil$ is the ceiling operator, i.e. the time-delay values $$\alpha_k^i \Delta + \hat{\tau}_{A,k},\ i \in \{1, \ldots, A\}$$

are checked. In order to decide for one of these ambiguities, a probability measure $p_k^i$ is introduced and assigned to each of the tested ambiguities. The likelihood histogram $p_k^i$ is initialized $$p_0^i = \frac{1}{A},\ i \in \{1, \ldots, A\}$$

and updated in each block $$p_k^i \propto p_{k-1}^i p\,\mathcal{Y}\,(\mathcal{Y}_k|\hat{\theta}_k^i, \hat{\gamma}_k(\hat{\theta}_k^i)).$$

with $$\hat{\theta}_k^i = [\alpha_k^i \Delta + \hat{\tau}_{A,k}, \hat{v}_k]^T,$$

where $\hat{\tau}_{A,k}$ and $\hat{v}_k$ are the estimates of the aligning filter. The histogram is then normalized such that $\Sigma_{i=1}^A p_k^i = 1$. The delay parameter can be determined with the histogram $$\hat{\tau}_k = a_k^i \Delta + \hat{\tau}_{A,k},$$

where $i^* = \arg\max_{i \in \{1, \ldots, A\}} p_k^i$. Clearly, the true ambiguity needs not to be among the tested ambiguities in the first stage if the initial search interval is wider than A ambiguities. In order to find the true ambiguity, the search needs to be refined. Thus, a counter $c_k^i$, $i=1, \ldots, A$, is introduced and initialized with zero, $c_n^i=0, \forall i$. Every time $p_k^i > \rho$, where $$\frac{1}{A} < \rho < 1,$$

$c_k^i$ by one. If a block is reached where $c_k^i$ exceeds the design parameter $C \in \mathbb{R}$, the algorithm decides for ambiguity $\alpha_k^i$ and refines the search on the ambiguity grid. The particles $\tau_k^i$ of the grid aligning filter are shifted $$\tau_k^j \leftarrow \tau_k^j + a_k^i \Delta,$$

i.e. also the estimate of the ambiguity $\tau_{A,k}$ is shifted $$\hat{\tau}_{A,k} \leftarrow \hat{\tau}_{A,k} + a_k^i \Delta,$$

and $\alpha_{max}$ is updated as $$a_{max} = \max\left(\chi, \frac{A-1}{2}\right)$$

with $$\chi = \max_{u,v \in \{1, \ldots, A\}} |a^u - a^v|$$

under the constraint $|u-v|=1$. The interval which is considered in the following blocks is a $[\hat{\tau}_{A,k} - \alpha_{max}\phi, \hat{\tau}_{A,k} + \alpha_{max}\Delta]$. The tested ambiguities are computed as stated above. Note that if a $$a_{max} = \frac{\tilde{A}-1}{2}$$

no further refinement is necessary since all ambiguities in the considered interval are tested.

Simulations

Figure 6:
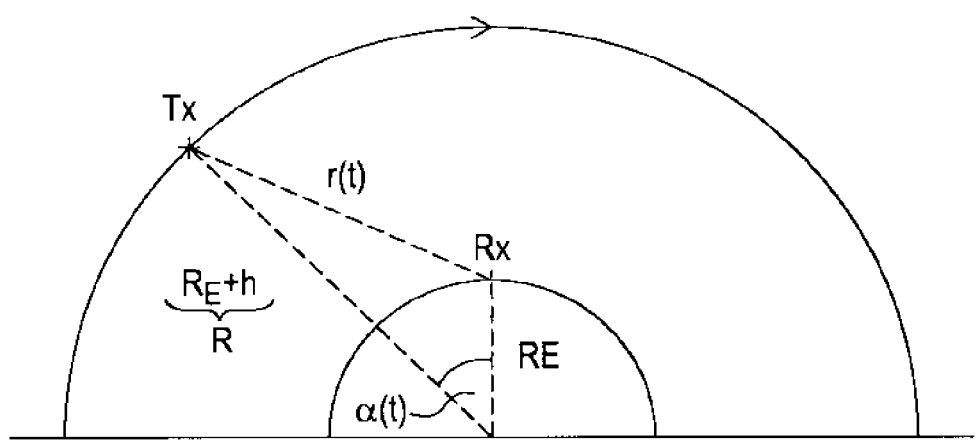
FIG. 6 illustrates a two-dimensional GNSS scenario used for the simulation of a method in accordance with an embodiment of the present invention.

For the simulations a simple two-dimensional GNSS scenario depicted in FIG. 6 is considered. The receiver is positioned on a circle with radius $R_E$ and center M. The receiver Rx is assumed to be static. The transmitter Tx moves on a circular orbit around the center M. If the transmitter is in the zenith, the distance between transmitter and receiver is h. The range r(t) between transmitter and receiver for this scenario depends on the angle $\alpha(t)=\sphericalangle(R_x, M, T_x)$ which is given as $$\alpha(t) = \alpha_0 - 2\pi\frac{t}{T_0},$$

where $T_0$ is the circulation time of the transmitter Tx and $\alpha_0 = \alpha(0)$. Applying the law of cosine results in $$r(t) = \sqrt{R_E^2 + R^2 - 2R_E R \cos(\alpha(t))}$$

for the range between transmitter and receiver, where $R=R_E+h$. The velocity is given by $$\dot{r}(t) = \frac{R_E R \sin(\alpha(t))\dot\alpha(t)}{r(t)}\ \text{with}\ \dot\alpha(t) = -\frac{2\pi}{T_b}.$$

For the simulations, the geometry is chosen according to a GPS scenario. $R_E = 6371*10^3$ m is equal to the radius of the earth. $T_0$=11 h 58 min and h=20200*10$^3$ m are chosen according to the satellites of GPS $$\alpha_0 = \frac{\pi}{4}.$$

The parameter $\sigma_w^2$ of the nearly constant velocity model is determined with a least squares approach. For the scenario this results in $\sigma_w^2$=2.6279*10$^{-14}$ The GPS-signal s'(t), the bandwidth B, the carrier frequency $f_c$ and the sampling frequency are chosen as described above. The signal strength is assumed to be 55 dB-Hz. The initial uncertainty of the acquisition is $$\sigma_{init,\tau} = 75 \text{ m},$$

$$\sigma_{init,v} = 50\frac{\text{m}}{\text{s}}.$$

Figure 7:
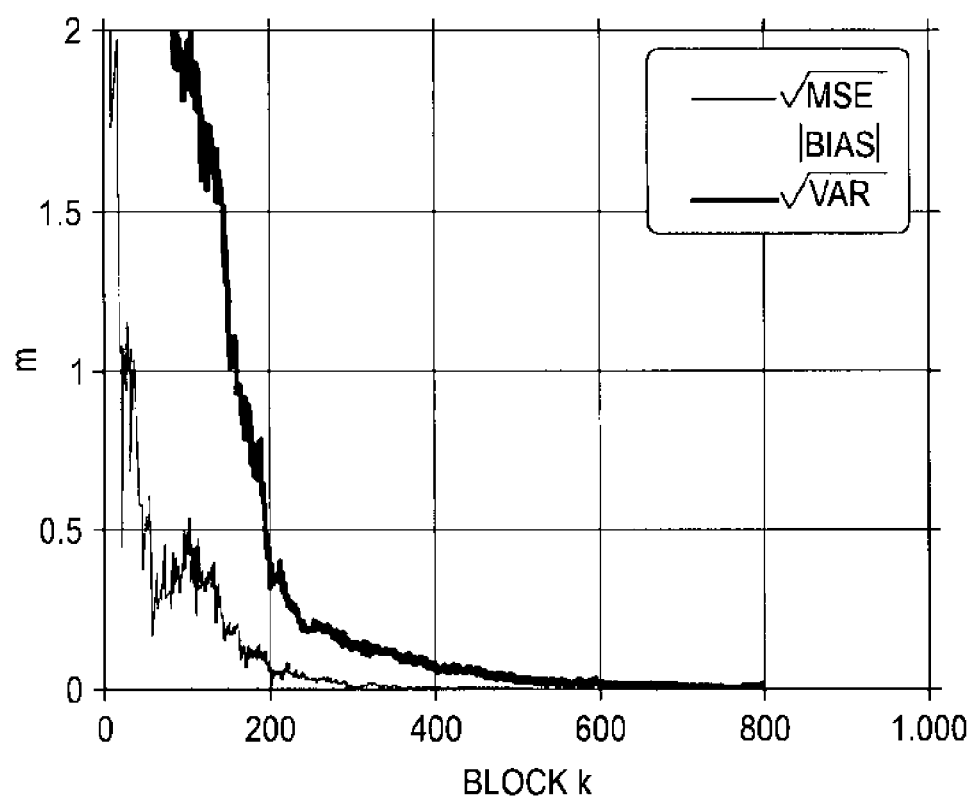
FIG. 7 illustrates the range estimation result obtained in a method in accordance with an embodiment of the present invention.

The design parameters for the algorithm are $\epsilon$=3.5, A=9, J=100 and C=10. In FIG. 7, the absolute value of the bias $$BIAS_k = E[\tau_k - \hat{\tau}_k],$$

the mean error (MSE)

$$MSE_k = E[(\tau_k - \hat{\tau}_k)^2]$$

and the variance $$VAR_k = MSE_k - BIAS_k^2$$

are measured for the estimation via LIAH with 250 realizations. It is observed, that the RMSE decreases to millimeter level within 1000 observation blocks $$\left(\sqrt{MSE_{1000}} \approx 10^{-3} \text{ m}\right).$$

Figure 8:
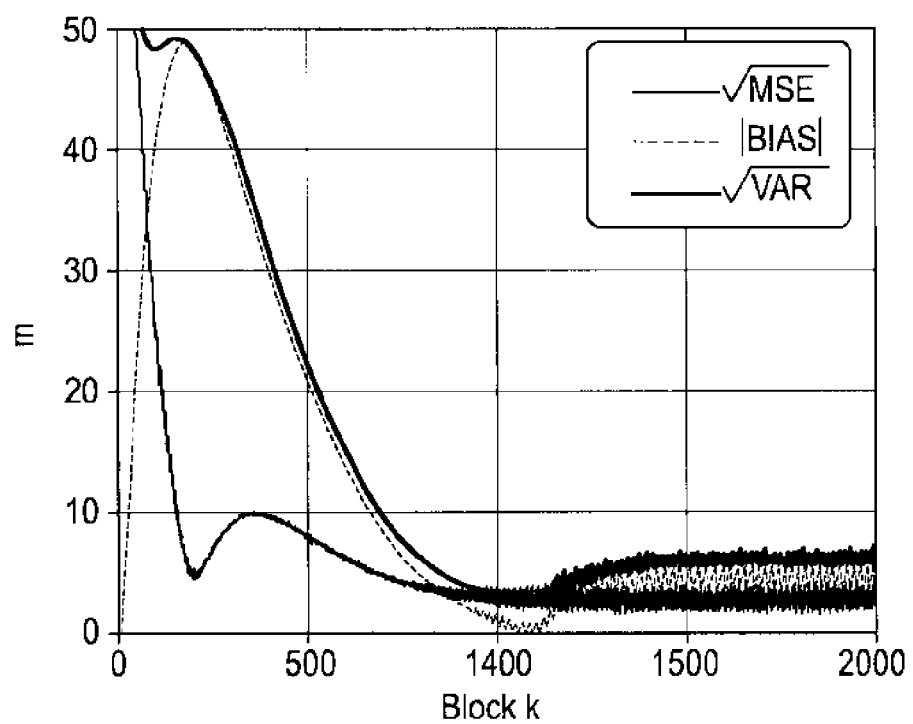
FIG. 8 illustrates the range estimation result obtained in a conventional DLL/PLL approach.

Apart from that, the estimation result is unbiased, i.e.

$$BIAS_k^2 \ll MSE_k$$

for k sufficiently large. As a reference, the range estimation result attained with a standard DLL/PLL approach, which is described and implemented in [16], is plotted in FIG. 8. The DLL/PLL damping ratio is 0.7 and the DLL bandwidth is 2 Hz, respectively. The PLL bandwidth is 25 Hz and the DLL correlator spacing is 0.5 Ct. 2500 realizations are used to measure the MSE, bias and variance. It can be observed that it is possible to estimate the range with the accuracy of a few meters with this standard approach. Interestingly, the mean square error (MSE)

$$MSE_k = BIAS_k^2 + VAR_k$$

of this prior art method is dominated by the bias, i.e. a systematic estimation error. Ignoring this error and considering the variance, it is possible to estimate the range on meter-level $$\left(\sqrt{VAR_{1000}} \approx 2.0 \text{ m}\right)$$

with this conventional approach.

Detailed Description of a Further Embodiment

In a further embodiment of the invention, the ranging problem is addressed by means of a frequency-modulated continuous-wave (FMCW) radar example with a single transmit and a single receive antenna. A complex-valued representation of a wireless transmit signal $x(t) \in \mathbb{C}$ can in general be factorized $$x(t) = x_c(t)x_b(t),$$

where the carrier signal $x_c(t) \in \mathbb{C}$ is a complex sinusoid $$x_c(t) = e^{j\omega_c t},$$

oscillating at carrier frequency $\omega_c \in \mathbb{R}$. The signal $x_b(t) \in \mathbb{C}$ denotes an application-dependent modulating baseband component. For FMCW radar the baseband signal is given by a complex-valued chirp $$x_b(t) = e^{j\mu t^2 t}, 0 \leq t < T_o,$$

where $\mu$ denotes the rate of change in rad per s$^2$ and $T_o$ the duration of the chirp signal. The bandwidth of the baseband signal is $$B = \frac{\mu T_o}{4\pi}.$$

The receiver observes a delayed and attenuated version of the transmit signal $$z(t) = \gamma x(t - \tau) + \eta z(t),$$

distorted by an additive white noise process $\eta z(t) \in \mathbb{C}$. The attenuation parameter $\gamma \in \mathbb{R}$ models the effect of the path loss and the antenna gain while $\tau \in \mathbb{R}$ represents the time-delay due to the propagation of the electro-magnetic radio wave between the transmitter and the receiver. For FMCW applications the receiver usually performs compression in the analog domain by multiplying the receive signal with the complex-conjugate transmit signal $$y(t) = z(t)x^*(t) \qquad (6)$$

$$f_s = \gamma e^{j\omega_c(t-\tau)}e^{j\mu(t-\tau-\frac{T_O}{2})(t-\tau)}e^{-j\omega_c t}e^{-j\mu(t-\frac{T_O}{2})t} + \eta_y(t)$$

$$= \gamma e^{-j\omega_c \tau}e^{j\left(-2\mu\tau t + \mu\tau\frac{T_O}{2} + \mu\tau^2\right)} + \eta_y(t).$$

The compressed signal is low-pass filtered to a bandwidth of $B_s > \mu\tau/\pi$ and sampled at a rate $$Fs = \frac{1}{T_s} = 2B$$

such that we finally obtain N digital receive samples $$y = \gamma e^{-j\omega_c \tau}b(\tau) + \eta$$

with the vector entries $$b_n(T) = e^{j\left(-2\mu\tau(n-1)T_s + \mu\tau\frac{T_O}{2} + \mu\tau^2\right)}$$

$$\eta_n = \eta((n-1)T_s).$$

where
in η(t) is the low-pass filtered version of $\eta_y(t)$ such that the digital noise samples η exhibit a white temporal covariance matrix $$E_\eta[\eta\eta^H] = I.$$

The ranging problem deals with the question how to extract a high-resolution estimate $\hat{\tau}(y)$ for the time-delay parameter r given the receive vector y.

Estimation Theoretic Performance

The achievable mean squared error (MSE) with an unbiased estimator is lower bounded by the Cramér-Rao lower bound (CRLB).

$$MSE(\tau) = E_{y;\tau}[(\hat{\tau}(y) - \tau)^2]$$

$$\geq \frac{1}{F(\tau)},$$

where the Fisher information with respect to the delay parameter is defined $$F(\tau) = \int_Y \left(\frac{\partial \ln p(y;\tau)}{\partial \tau}\right)^2 dy.$$

The optimum estimator which asymptotically achieves the theoretic limit is the maximum-likelihood estimator (MLE)

$$\hat{\tau}(y) = \arg\max_{\tau \in R} \ln p(y;\tau).$$

Based on the above three formulas, it becomes clear that the performance and complexity of the ranging problem depends on the statistical receive model p(y;τ).

Conventional Baseband-Oriented Ranging:

The conventional approach to the ranging problem is based on the simplification that the effect of the propagation delay τ onto the carrier component $x_c(t)$ can be modeled as a constant independent phase shift φ, i.e., $$y = \gamma e^{-j\omega_c \tau} b(\tau) + \eta$$

$$= \gamma e^{j\phi} b(\tau) + \eta,$$

such that the parametric probability density function of the received signal is modeled as $$p(y;\tau) \sim \exp\left(-\|y - \gamma e^{j\phi} b(\tau)\|_2^2\right).$$

The Fisher information with respect to the delay parameter is given by $$F_b(\tau) = 2\gamma^2 \ Re\left\{\left(\frac{\partial b(\tau)}{\partial \tau}\right)^H \frac{\partial b(\tau)}{\partial \tau}\right\}$$

$$= 2\gamma^2 \sum_{n=1}^{N} \left(\frac{\partial b_n(\tau)}{\partial \tau}\right)^2 \frac{\partial b_n(\tau)}{\partial \tau}$$

$$= 2\gamma^2 \sum_{n=1}^{N} \left(-2\mu(n-1)T_s + \mu\frac{T_o}{2} + 2\mu\tau\right)^2,$$

where it has been used that $$\frac{\partial b_n(\tau)}{\partial \tau} = j\left(-2\mu(n-1)T_s + \mu\frac{T_o}{2} + 2\mu\tau\right) \cdot e^{j\left(-2\mu\tau(n-1)T_s + \mu\tau\frac{T_o}{2} + \mu\tau^2\right)}.$$

Joint Carrier-Baseband Ranging:

In the case where the exact model and the parametric probability density function (the carrier-oriented model)

$$p(y;\tau) \sim \exp\left(-\|y - \gamma e^{-j\omega_c \tau} b(\tau)\|_2^2\right)$$

is used. Then the time-delay Fisher information is $$F_c(\tau) = 2\gamma^2 \ Re\left\{\left(\frac{\partial e^{-j\omega_c \tau} b(\tau)}{\partial \tau}\right)^H \frac{\partial e^{-j\omega_c \tau} b(\tau)}{\partial \tau}\right\} \quad (19)$$

$$= 2\gamma^2 \sum_{n=1}^{N} \left(-2\mu(n-1)T_s + \mu\frac{T_o}{2} + 2\mu\tau - \omega_c\right)^2.$$

Figure 9:
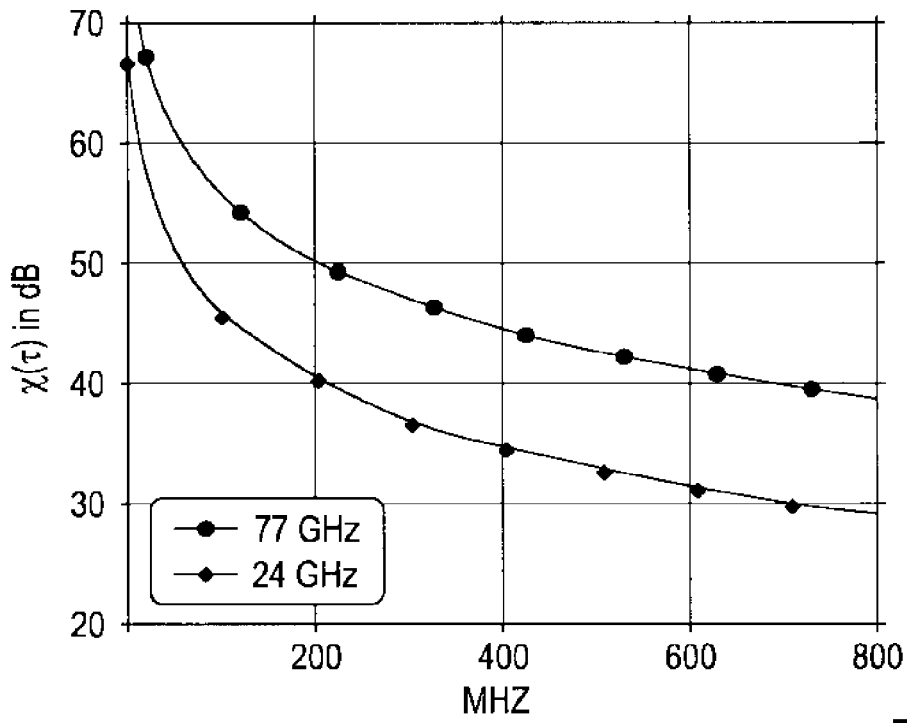
FIG. 9 illustrates Joint Carrier-Baseband Ranging and SNR Gain in accordance with an embodiment of the present invention.

In FIG. 9 the information ratio $$\chi(\tau) = \frac{F_c(\tau)}{F_b(\tau)}$$

between both Fisher information measures is depicted for a system with carrier frequency $f_c$=24 GHz and with $f_c$=77 GHz. The values $T_o$=10 μs, τ=40 ns are set and χ(t) calculated as a function of the bandwidth B in MHz. It can be observed that switching from the model applied in the conventional approach to the carrier-oriented model is associated with a significant Fisher information gain. Measured in equivalent signal-to-noise ratio (SNR) the carrier-oriented model provides an information gain of 40 dB for a system with $f_c$=24 GHz and B=200 MHz which, due to the relation between the MSE and the Fisher information, is equivalent to diminishing the root-mean squared error $\sqrt{MSE(\tau)}$ by a factor of 100. This approximately corresponds to the ratio $$\frac{f_c}{B}.$$

Consequently, the performance gain which is associated with the configuration $f_c$=77 GHz is higher than for the system with $f_c$=24 GHz.

Ranging Complexity

While the carrier-oriented model seems highly attractive with respect to its estimation theoretic performance, it has a serious drawback when considering the complexity associated with practical estimation algorithms. In order to envision this aspect, the maximum-likelihood estimator for the model applied in the conventional approach is considered. Given a specific ranging parameter τ the complex attenuation can be substituted $$\gamma e^{j\phi} = \frac{b^H(\tau)y}{b^H(\tau)b(\tau)} = \frac{b^H(\tau)y}{N},$$

such that the time-delay maximum-likelihood estimate is found by solving (maximization task)

$$\hat{t} = \arg\max_{\tau \in R} \frac{|b^H(\tau)y|^2}{b^H(\tau)b(\tau)}$$

$$= \arg\max_{\tau \in R} f_b(y;\tau).$$

Figure 10:
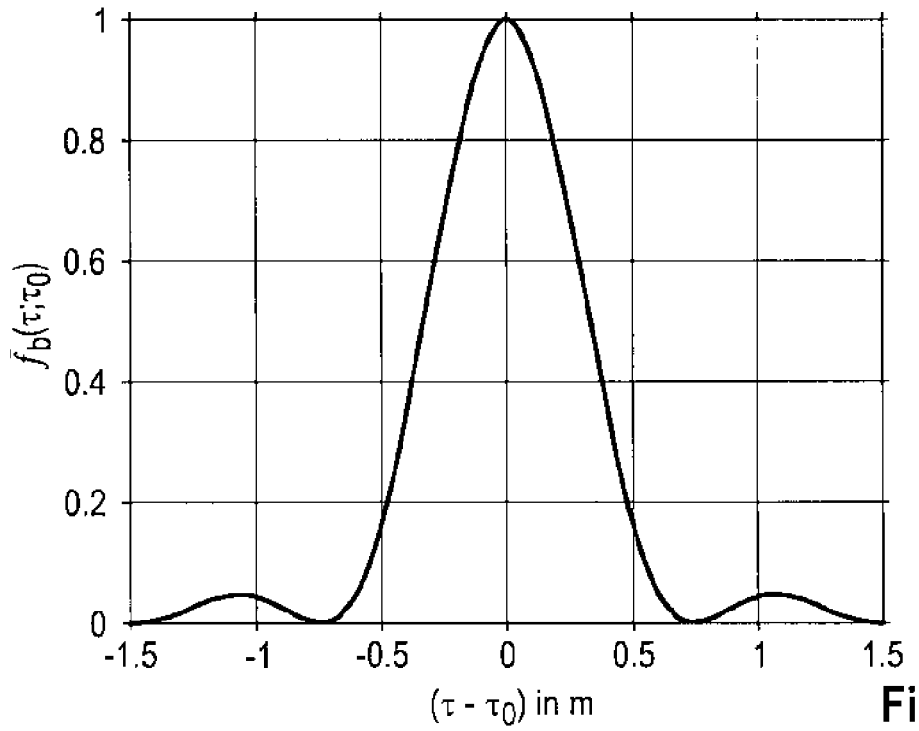
FIG. 10 illustrates the normalized expected value of the likelihood function for baseband-oriented ranging in accordance with an embodiment of the present invention.

Depicted in FIG. 10 is the normalized expected value of the likelihood function $$\frac{E_{y;\tau_0}[f_c(y;\tau)]}{N} = \frac{|b^H(\tau)b(\tau_0)|^2}{N^2}$$
$$= \bar{f}_b(\tau;\tau_0)$$

under the true parameter $\tau_0$ for the exemplary system with $f_c$=24 GHz and B=200 MHz. It can be observed that the likelihood function decays smoothly and that the maximization task can be solved at low complexity as the objective function has a one pronounced global extremum. Using the carrier-oriented model we obtain the substitution $$f = \frac{Re\{(e^{-j\omega_c\tau}b(\tau))^H y\}}{N},$$

for the real-valued attenuation $\gamma$, such that the likelihood function obtains the form $$f_c(y;\tau) = \frac{Re\{(e^{-j\omega_c\tau}b(\tau))^H y\}^2}{N}.$$

Figure 11:
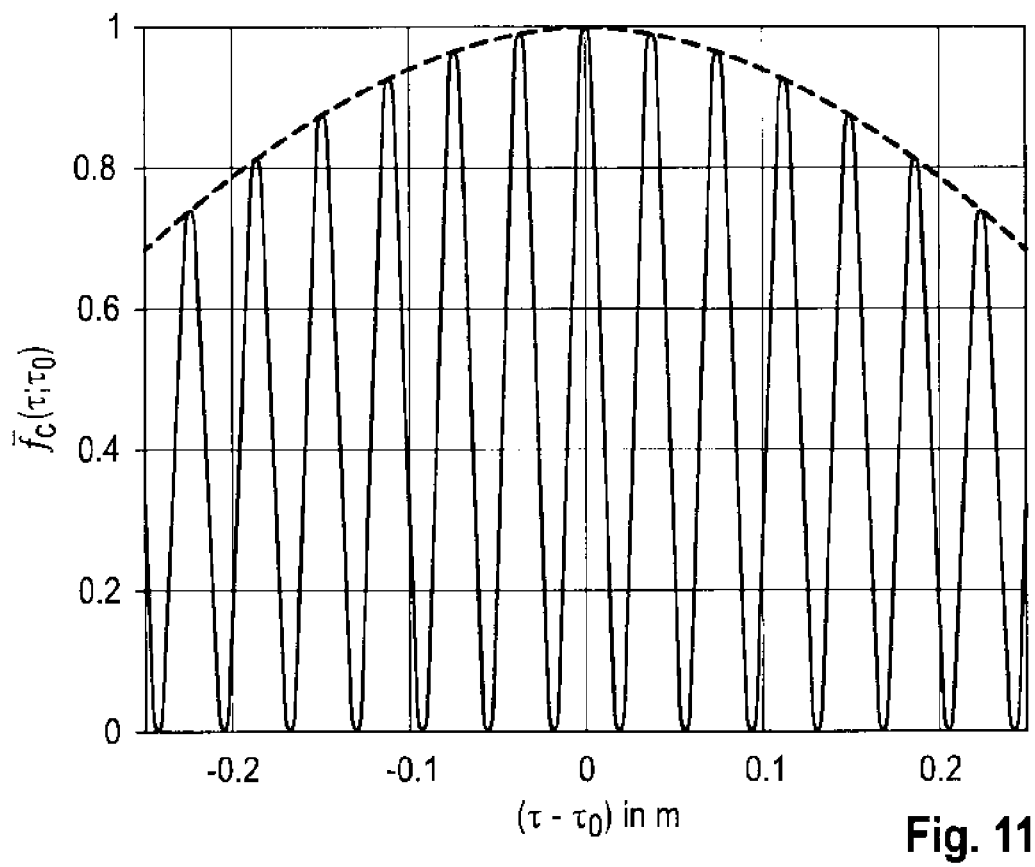
FIG. 11 illustrates the normalized expected value of the likelihood function for carrier-baseband ranging.

In FIG. 11 the normalized expected likelihood function is depicted $$\frac{E_{y;\tau_a}[f_c(y;\tau)]}{N} = \frac{Re\{(e^{-j\omega_c\tau}b(\tau))^H(e^{-j\omega_c\tau_0}b(\tau_0))\}^2}{N^2} \quad (26)$$
$$= \bar{f}_c(\tau;\tau_0).$$

It becomes obvious that the expected likelihood function has a significantly sharper extremum at $\tau_0$ than the baseband-oriented counterpart normalized expected value of the likelihood function. However, maximization of the likelihood function $f_c(y;\tau)$ under an individual realization of the observation data $y$ is difficult as the likelihood function exhibits pronounced side lobes around the true parameter. This also causes the problem that for certain noise realizations a side lobe attains a higher likelihood value than the main lobe which is close to the true parameter, therefore causing a high estimation error. However, the discussed FMCW radar example shows that using the joint carrier-baseband model is in theory associated with a significant accuracy gain but might in practice require high computational complexity and high integration time in order to benefit from this estimation theoretic fact.

Example of Implementation

As will be described in more detail below, the present invention discloses a method wherein it is possible to derive a reliable low-complexity algorithm which enables the full ranging precision provided by the exact measurement (carrier-oriented) model of the line-of-sight propagation delay after a short transient phase to be obtained. According to this exemplary implementation of the present invention, a joint carrier-baseband time-delay estimation is formulated as a state-space estimation problem wherein access to side information about the temporal evolution of the propagation delay process is utilized and signal processing may be performed over subsequent observation blocks. Based on the state-space model, a theoretic Bayesian performance bound and a nonlinear tracking algorithm is formulated which allows to accurately align to the moving set of likelihood extrema. In addition, a LIAH is constructed by evaluating and accumulating the likelihood function in an efficient way on a subset of possible range estimation solutions. After a short transient phase the histogram allows to detect the most probable ambiguity out of the solution set and to output an ultra-precise and unambiguous delay estimate for every observation block. With the applications of FMCW radar and GPS satellite-based positioning the efficiency of this approach is demonstrated by the present invention and the possible performance level highlighted. For a traffic control scenario, a sub-millimeter accuracy with a 24 GHz FMCW radar (240 MHz bandwidth) is obtained by performing ranging with the proposed approach of the present invention. For a GPS setup with $f_c$=1.57 GHz (6.138 MHz bandwidth) it is shown that LIAH allows unambiguous low SNR tracking of the range parameter with respect to a fast moving narrowband transmit satellite at a RMSE level of a few millimeters.

System Model

Analog Transmit and Receive Signal

A mobile sender $x(t_x)$ and a mobile receive sensor $z(t)$ both comprise individual clocks $t_x$ and $t$. The transmitter emits an analog radio wave $$x(t_x) = e^{j\omega_c t_x} x'_b(t_x)$$

on the carrier frequency $f_c$ with a baseband component $x'_b(t_x) \in \mathbb{C}$. At the receive sensor $z(t)$ the transmit signal arrives attenuated by $\gamma(t) \in \mathbb{R}$ and delayed by $\tau(t) \in \mathbb{R}$ $$z(t) = \gamma(t)x(t - \tau(t)) + \eta'(t)$$
$$= \gamma(t)e^{j\omega_c(t-\tau(t))}x'_b(t - \tau(t)) + \eta'(t).$$

After demodulation and low-pass filtering to a bandwidth of $B_s$, the analog output (receive signal) is obtained $$y(t) = h(t) * (e^{-j\omega_c t} z(t))$$
$$= \gamma(t)e^{-j\omega_c\tau(t)}x_b(t - \tau(t)) + \eta(t).$$

This receive signal is further processed in blocks. In the k-th block, where it is assumed that the rate of change of the delay process and the attenuation are approximately $$(k-1)T_0 \leq t < kT_0,$$

constant, i.e., $$\tau(t) \approx \tau_k + v_k(t - (k-1)T_0)$$

$$\gamma(t) \approx \gamma_k.$$

Digital Receive Signal

Sampling the analog signal at a rate of $f=2B_s$ the k-th receive block is obtained $$y_k = \gamma_k e^{-j\omega_c\tau_k} v(v_k) \odot x(\tau_k, v_k) + \eta$$
$$= \gamma_k s(\theta_k) + \eta$$

with $$v_n(v_k) = e^{-j\omega_c v_k(n-1)T_s}$$
$$x_n(\tau_k, v_k) = x_b((1-v_k)(n-1)T_s - \tau_k)$$
$$\eta_a = \eta((n-1)T_s)$$

and $$s(\theta_k) = e^{-j\omega_c\tau_k} v(v_k) \odot x(\tau_k, v_k).$$

where all parameters of the delay process have been summarized into a state-space vector $$\theta_k = [\tau_k v_k]^T.$$

The measurement model is therefore fully characterized by the parametric probability density function $$p(y_k \mid \gamma_k, \theta_k) = \frac{1}{\pi^N} \exp(-\|y_k - \gamma_k s(\theta_k)\|_2^2).$$

Substituting the attenuation parameter by its maximum-likelihood estimate $$\gamma_k = \frac{\mathrm{Re}\{s^H(\theta_k) y_k\}}{s^H(\theta_k) s(\theta_k)}.$$

a compressed measurement model can be stated in the form $$\tilde{p}(y_k \mid \theta_k) = \frac{1}{\pi^N} \exp\left(-\left\|y_k - \frac{\mathrm{Re}\{s^H(\theta_k) y_k\} s(\theta_k)}{s^H(\theta_k) s(\theta_k)}\right\|_2^2\right). \quad (39)$$

State-Space Model

Due to the assumption that during one observation block the rate of change of the delay process $v_k$ stays nearly constant, additionally to the measurement equation a state-space model can be formulated $$\theta_k = Q\theta_{k-1} + \omega_k$$

with $$Q = \begin{bmatrix} 1 & T_o \\ 0 & 1 \end{bmatrix}$$

and $$E_{\omega_k}[\omega_k \omega_k^T] = \sigma_\omega^2 \begin{bmatrix} \frac{T_o^3}{3} & \frac{T_o^2}{2} \\ \frac{T_o^2}{2} & T_o \end{bmatrix}$$

$$= W,$$

where $\sigma_w$ is an application-specific variable, such that the state-space model is fully characterized by the process model $$p(\theta_k \mid \theta_{k-1}) = \frac{\exp\left(-\frac{1}{2}(\theta_k - Q\theta_{k-1})^T W^{-1}(\theta_k - Q\theta_{k-1})\right)}{2\pi\sqrt{\det W}}. \quad (43)$$

For the initialization of the state-space model it is assumed that prior knowledge $$\rho(\theta_0) = \frac{\exp\left(-\frac{1}{2}(\mu_0 - \theta_0)^T \Sigma_0^{-1}(\mu_0 - \theta_0)\right)}{2\pi\sqrt{\det \Sigma_0}}$$

is available. According to the process model, the marginal $p(\theta_k)$ is a Gaussian random variable with mean $$\mu_k = Q\mu_{k-1}$$

$$= Q^k \mu_0$$

and covariance $$\Sigma_k = Q(\Sigma_{k-1} + W)Q^T.$$

Nonlinear Filtering Problem

The resulting signal processing task of deducing an accurate estimate for the delay process $z(t)$ is identified as a nonlinear Bayesian tracking problem. The solution to such a problem is to combine the measurement model and the process (state-space) model in order to calculate the optimum filter (optimum estimate)

$$\hat{\theta}_k(Y_k) \int_{\Theta_k} \theta_k p(\theta_k \mid Y_k) d\theta_k$$

of the block-wise state parameter vector $\theta_k$, where the receive matrix $$Y_k = [\, y_1 \;\; y_2 \;\; \ldots \;\; y_k \,]$$

contains the receive signals of the k-th block and all k−1 blocks received in the past. The average tracking error in the k-th block is given by the MSE matrix $$R_k = E_{\theta_k, Y_k}\left[(\hat{\theta}(Y_k) - \theta_k)(\hat{\theta}(Y_k) - \theta_k)^T\right].$$

Tracking with a Low-Complexity Filter

In order to calculate the optimum estimate for the problem at hand it is required to find an appropriate representation of the a posteriori probability density $$p(\theta_k \mid Y_k) = \frac{\tilde{p}(y_k \mid \theta_k) p(\theta_k \mid Y_{k-1})}{p(y_k \mid Y_{k-1})}$$

by using the measurement model while, with the process (state-space) model, the a priori probability density is given by $$p(\theta_k \mid Y_{k-1}) = \int_{\Theta_{k-1}} p(\theta_k \mid \theta_{k-1}) p(\theta_{k-1} \mid Y_{k-1}) d\theta_{k-1}.$$

Achieving a performance close to the theoretic limit through a low-complexity approximation of the optimum estimate is challenging. This is due to the fact that for a problem with nonlinear measurement model no closed-form solutions for the required calculation of these aforementioned formulas exist.

Resolving the Ambiguity Problem

Figure 3:
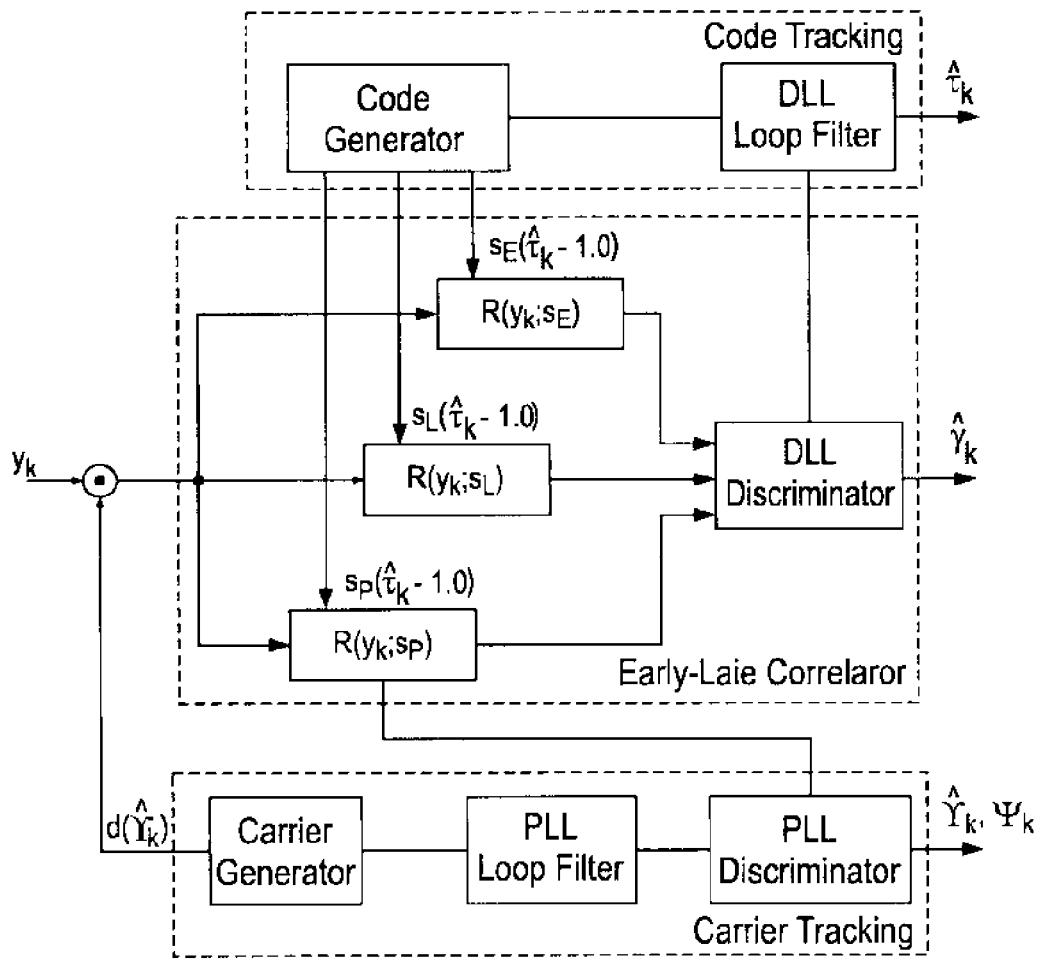
FIG. 3 is a flow chart illustrating the steps performed by a tracking module with DLL/PLL in accordance with an embodiment of the present invention.

Additionally, here the probability density function of the measurement model has a highly multimodal shape within the delay parameter $\tau_k$. In the direction of the velocity parameter $v_k$, the probability density function decays smoothly. This problem is known as ambiguity problem and is visualized by the expected likelihood function $f_c(\tau; \tau 0)$ depicted in FIG. 3. However, it is also observed that the baseband component $x_b(t)$ produces a slight decay in the absolute values of the extrema of $\bar{f}_c(\tau; \tau_0)$. This indicates that over time one of the modes of $p(\theta_k \mid Y_k)$ will become dominant such that precise and unambiguous estimation of the time-delay parameter is possible. Using a standard particle filter for tracking the a posterior density requires a extremely high number of particles in order to accurately approximate its multimodal shape. For the problem at hand this makes state estimation with conventional methods computationally prohibitively complex. Following the concepts developed in the first embodiment of the present invention, it is proposed to use a low-complexity approximation of the a posteriori probability density, where the knowledge about the multimodal structure of the measurement model is exploited. The approach according to this embodiment of the present invention comprises two main steps. First, a particle filter is used in order to precisely align to a single mode of the a posteriori probability density. Then, advantage is taken of the fact that, due to the measurement model, the distance of the multiple modes in the direction of the delay parameter $\tau_k$ are placed at a regular distance of $$\Delta = \frac{\lambda}{2c} = \frac{\pi}{\omega_c},$$

where $\lambda$ is the wave-length and the speed of light. Therefore, the values of the a posteriori probability density are tracked exclusively at points which are located $l\Delta$, $l \in \mathbb{Z}$ around the aligning mode. This is achieved by constructing a LIAH over subsequent blocks. Combining the information of the aligning filter and the ambiguity histogram enables deduction of an unambiguous and precise solution for the ranging problem.

Ambiguity Aligning with a Gaussian Particle Filter

For the adaptive alignment and tracking of the ambiguity grid a Gaussian particle filter is used. To this end, a single mode of the a posteriori density in block k is approximated by a multivariate normal distribution $N(\mu_k, \Sigma_k)$ with mean $\mu_k$ and covariance $\Sigma_k$ and the single-mode a priori density is approximated by $N(\tilde{\mu}_k, \tilde{\Sigma}_k)$ with mean $\tilde{\mu}_k$ and covariance $\tilde{\Sigma}_k$. In order to update these representations, in the k-th block J particles are drawn from the approximation of the a priori density $$\theta_k^j \sim N(\tilde{\mu}_k, \tilde{\Sigma}_k)$$

and the measurement model is used to calculate the weights $$\bar{w}_k^j \sim \tilde{p}(\mathcal{Y}_k | \theta_k^j)$$

with the received signal $y_k$. After normalization of the particle weights $$\omega_k^j = \frac{\bar{w}_k^j}{\sum_{j=1}^{J} \bar{w}_k^j}$$

the mean and covariance of the a posteriori density are estimated by $$\hat{\mu}_k = \sum_{j=1}^{J} \omega_k^j \theta_k^j,$$

$$\hat{\Sigma}_k = \sum_{j=1}^{J} \omega_k^j (\theta_k^j - \mu_k)(\theta_k^j - \mu_k)^T.$$

Then a correction is applied in order to form the a posteriori mean $$\mu_k = \hat{\mu}_k + \mu_\Delta(l_k),$$

where $$\mu_\Delta(l) = [l\Delta \, 0]^T$$

is a shift of the delay estimate by $l \in \mathbb{Z}$ modes. The shift information $l_k$ for each block is provided by the ambiguity resolution algorithm described in the next section. In a prediction step the a priori for the (k+1)-th block is formed by $$\tilde{\mu}_{k+1} = Q \mu_k$$

$$\tilde{\Sigma}_{k+1} = Q \Sigma_k Q^T + Z,$$

In order to focus on a single mode in the direction of the delay parameter, in the first block k=1 the alignment filter is initialized with the a priori knowledge $$\tilde{\Sigma}_l = \begin{bmatrix} \left(\rho_P \frac{\Delta}{6}\right)^2 & 0 \\ 0 & \delta_{v,1}^2 \end{bmatrix},$$

where $\rho_P < 1$. As the measurement model is highly informative with respect to the delay parameter, the estimate of the a posterior covariance matrix degenerates within the first tracking blocks, i.e., the entries of the a posterior covariance matrix become very small. Further, with the update by the precise state-space model, the degeneracy propagates into the next block. This forms a severe problem for the convergence of the velocity parameter estimates $v_k$ which is essential for the correct behavior of the LIAH algorithm. In order to counteract the effect of fast degeneration of the covariance matrices, while preserving the ability of the algorithm to take advantage of the precise measurement and state-space model, the a posterior covariance estimate is smoothed by the a prior covariance matrix with a smoothing factor $\rho_S < 1$. Further, in order to prevent divergence of the algorithm, the individual entries of the a prior covariance are restricted to the values of the initialization matrix $$[\tilde{\Sigma}_{k+1}]_{11} \leq [\tilde{\Sigma}_1]_{11}$$

$$[\tilde{\Sigma}_{k+1}]_{22} \leq [\tilde{\Sigma}_1]_{22}.$$

while preserving positive semi-definiteness by $$|[\tilde{\Sigma}_{k+1}]_{12}| = \left|[\tilde{\Sigma}_{k+1}]_{21}\right| \leq \sqrt{[\tilde{\Sigma}_{k+1}]_{11}\,[\tilde{\Sigma}_{k+1}]_{22}}.$$

These steps result in a smooth convergence of the covariance matrices during the alignment process and an increasing tracking accuracy over time while avoiding degeneracy.

Ambiguity Resolution—Likelihood Histogram (LIAH)

While the alignment filter provides local information about the a posteriori density around the aligning mode, the ambiguity resolution algorithm aims at the likelihood characterization of a set A of surrounding modes. In order to select the best mode for the solution for the ranging problem a likelihood ambiguity histogram (LIAH) with $|A|=A$ elements is adaptively updated in each block by calculating the histogram weights $$\bar{w}_k^\alpha \sim w_{k-1}^\alpha \tilde{p}(\mathcal{Y}_k | \theta_k^\alpha)$$

with $$\theta_k^\alpha = \hat{\mu}_k + \mu_\Delta(l_k^\alpha)$$

and performing the normalization $$\omega_k^a = \frac{\tilde{\omega}_k^a}{\sum_{a=1}^{A} \tilde{\omega}_k^a}.$$

The sequence $l_a^k$ characterizes the set A of modes which are evaluated around the aligning mode $\mu_k$. In order to reduce and fix the complexity of the algorithm the sequence $l_a^k$ is designed such that the A bins of the histogram cover values $$l^a \in [-\sigma_H; \sigma_H],$$

i.e., not all modes are checked when σH>A−12. Note, that in order to obtain a symmetric histogram A=|A| is restricted to odd numbers. After each update, the histogram is monitored by calculating its mean and standard deviation $$l_{LIAH,k} = \sum_{a=1}^{A} \omega_k^a l_k^a,$$

$$\sigma_{LIAB,k} = \sqrt{\sum_{a=1}^{A} \omega_k^a (l_k^a - l_{LIAH,k})^2}.$$

In order to adjust the aligning algorithm to the dominant mode, a counter $c^{a*}$ is incremented if the histogram uncertainty falls below $$\frac{\sigma_{LIAH,k}}{\sigma_H} < \rho_U,$$

where the most likely mode is selected from the histogram by $$a^* = \arg\max_{a \in \mathcal{A}} \omega_k^a.$$

If the uncertainty is higher than the aforementioned threshold, all counters $c^a$ are set to zero. In the case that $c^a$ exceeds the threshold $c^a > C$, a histogram shift is triggered. Therefore, the ambiguity resolution algorithm informs the aligning filter to shift the a priori and a posteriori estimates by $l_k = l^{a*}_k$ modes. In the case of no shift event $l_k = 0$ is set. After each shift event the histogram size is adjusted $$\sigma_H = \max\left(\frac{A-1}{2}, \rho_H \sigma_H\right)$$

with ρH<1, a new sequence $l_a^k$ is formed according to the A bins of the histogram values and the histogram weights are initialized by $$\omega_k^a = \frac{1}{A}.$$

The computational complexity of the LIAH algorithm is restricted by checking only a subset of modes within a certain delay interval. In the initial phase of the tracking process, the correct ambiguity is not necessarily part of the ambiguity set A. The approach of diminishing the size of the histogram range σH assures that the set of tested ambiguities is refined with each shift event in a conservative way until A neighboring ambiguities, centered by the aligning mode, are checked. When the histogram size has reached the smallest range, i.e., $$\sigma_H = \frac{A-1}{2},$$

with each subsequent shift event the shift threshold C is increased and the histogram initialized by $$w_k^a = N(l = l_k^a; 0, \rho_W \sigma_H)$$

and a subsequent normalization, in order to diminish the probability of further shift events and favor bins in the middle of the histogram.

Applications and Simulation Results

In order to demonstrate the possible ranging performance under a precise observation model and exploitation of the available side information provided by the state-space model two technical applications are considered by the present invention i.e. ranging with a FMCW radar and synchronization with GPS. For both examples, a typical scenario and a strict reference is defined in order to measure the estimation error with Monte-Carlo simulations.

Ranging with a FMCW Radar

Figure 12:
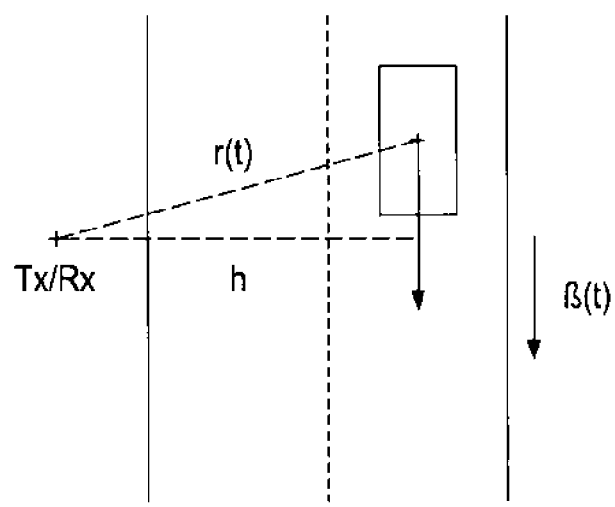
FIG. 12 illustrates a traffic control scenario in accordance with an embodiment of the present invention.

In addressing the initial radar problem, a velocity control scenario on a highway with a FMCW radar system is considered. A car is driving at a constant velocity v along a road. A FMCW transceiver with a single transmit and a single collocated receive sensor is placed at a distance h from the middle of the traffic lane (see FIG. 12). The car reflects the FMCW radio wave with baseband structure $$x_b(t) = e^{j\frac{\mu}{2}\left(t - \frac{T_0}{2}\right)^2}, 0 \leq t \leq T_o.$$

By measuring the propagation delay process τ(t) from the receive blocks $\gamma_k$ the radar system is able to deduce the velocity v of the car and check for compliance with the traffic rules. In this example, the position of the car is parameterized $$\beta(t) = \beta_0 + vt.$$

This allows calculation of an exact reference for the distance $$r(t) = \sqrt{h^2 + (\beta_0 + vt)^2}$$

and the relative velocity $$\dot{r}(t) = \frac{(\beta_0 + vt)v}{\sqrt{h^2 + (\beta_0 + vt)^2}},$$

between car and the FMCW radar transceiver, such that it is possible to use $$\tau(t) = \frac{r(t)}{c}$$

in order to evaluate the range estimation error and $$v(t) = \frac{\dot{r}(t)}{c}$$

for the estimation error of the relative velocity. For this example a car velocity of v=120 km/h is assumed and a measurement distance of h=10 m. For the FMCW transceiver the carrier frequency $$\frac{\omega_c}{2\pi} = 24$$

GHz is set, the observation time for each block to $T_o=1$ μs and the bandwidth to $B=240$ MHz. Measuring the error of the autoregressive model (43) by $$\sigma_\omega = \sqrt{\frac{1}{2(K_0+1)} \sum_{k=-K_0}^{K_0} \left(\frac{\dot{r}(kT_o)}{c} - \frac{\dot{r}((k-1)T_o)}{c}\right)^2}$$

for $K_0=20000$ blocks around the starting point $$\beta_0 = \beta(0) = -33.33 \text{ m},$$

a process error level of $$\sigma_w = 0.00264.$$

is obtained. For each run the algorithm is initialized randomly by $$\tau_0 \sim \mathcal{N}\left(\tau(0), \frac{1 \text{ m}}{c}\right),$$

$$v_0 \sim \mathcal{N}\left(v(0), \frac{50 \text{ m/s}}{c}\right).$$

Figure 13A:
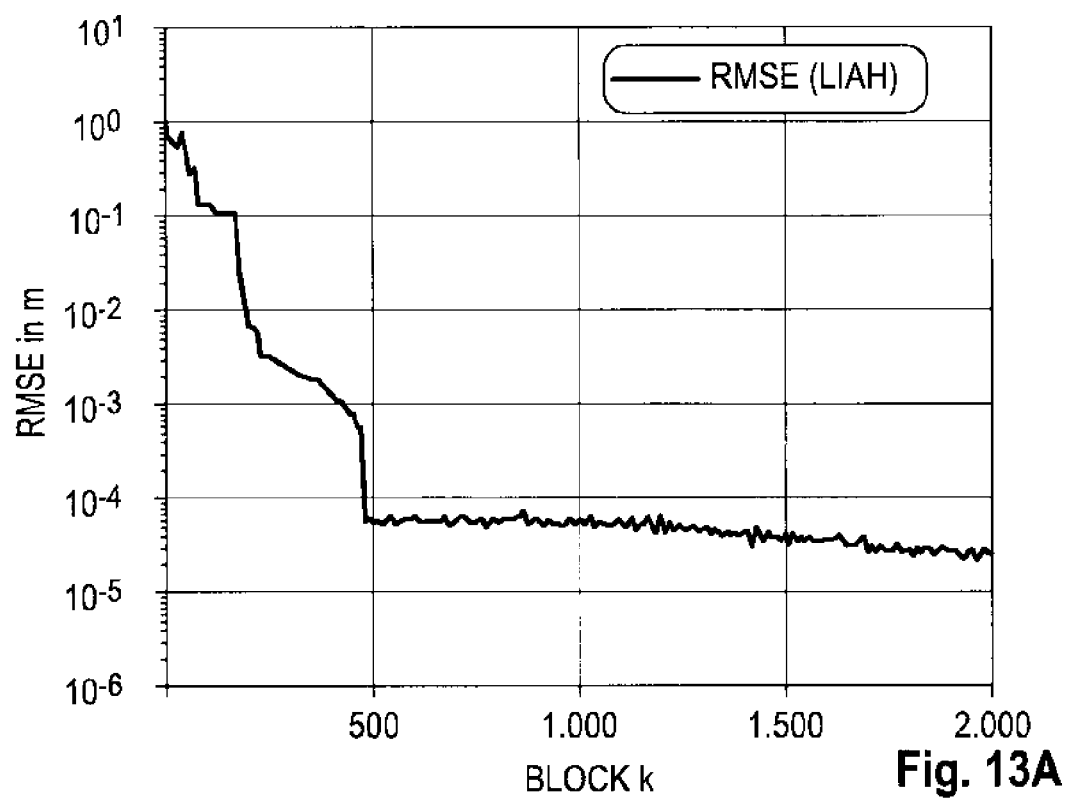
FIGS. 13a-d respectively illustrate range estimation results obtained in a method in accordance with an embodiment of the present invention
Figure 13B:
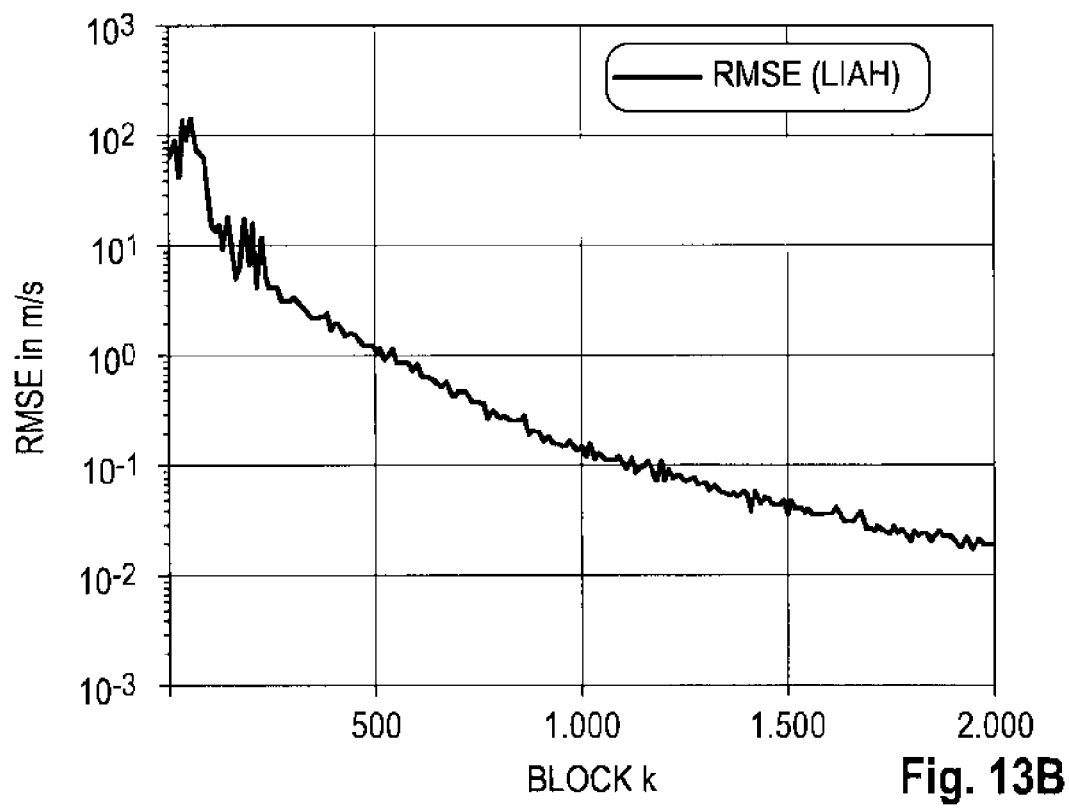

For the alignment algorithm $J=100$ particles and $\rho_P=\frac{1}{4}$ are used. The histogram has size $A=11$, a shift threshold of $C=10$, an initial width of $\sigma_H=9*1\text{m}/\Delta c$ modes, a resizing factor of $\rho_H=0.5$ and a low-level initialization factor of $\rho_W=0.33$. For covariance smoothing $\rho_S=0.99$ is used. FIGS. 13a and 13b show the estimation performance of the proposed LIAH algorithm averaged over 100 noise realizations for each of the $K=2000$ blocks in a scenario with a receive power level of SNR=0 dB. It can be observed in FIG. 13a, that after approximately 0.5 ms the LIAH algorithm provides an unambiguous FMCW ranging solution with a root-mean squared error (RMSE) below 0.1 mm. The achievable performance with a classical baseband oriented approach is within a RMSE of a few cm. Therefore, LIAH allows to improve the FMCW ranging accuracy by approximately a factor of 100. FIG. 6 shows the accuracy of the relative velocity estimate, where after 2 ms the LIAH algorithm reaches a RMSE level of a few cms.

Satellite-based Positioning (GNSS)

As a second technical application, the present invention contemplates satellite-based position with the GPS system. For the example scenario a single in-view transmitting satellite moving on a circular orbit around the earth is considered. The height of the satellite is h and the radius of the earth is $R_E$ (see FIG. 6).

The scenario is parameterized by a time-dependent angle $$\alpha(t) = \alpha_0 - \frac{2\pi}{T_R}t,$$

where $\alpha_0$ is the starting angle at $t=0$ and $T_R$ is the duration of one full orbit. This simple model allows the generation of a rigorous reference $$r(t) = \sqrt{R_E^2 + R^2 - 2R_E R \cos(\alpha(t))}$$

for the distance between satellite and receiver and its rate of change $$\dot{r}(t) = -\frac{2R_E R \pi \sin(\alpha(t))}{T_R \sqrt{R_E^2 + R^2 - 2R_E R \cos(\alpha(t))}}.$$

A reasonable setup according to a GPS application is $R_E=6371\cdot10^3$ m, $T_R=11$ h 58 min and $h=20200\cdot10^3$ m. The GPS baseband signal has the structure $$x_b(t) = \sum_{m=-\infty}^{m=\infty} d_m g(t - mT_c),$$

where $d_m$ is a satellite-dependent chip sequence of length $M=1023$.

$$T_c = \frac{1}{1.023 \text{ MHz}}$$

is the duration of each chip and g(t) is a bandlimited transmit pulse. Due to the signal structure the duration of one signal period is $T_o=1$ ms. A typical GPS carrier frequency is $\omega_c/2\pi=1.57$ GHz and a bandwidth of $B=6\cdot1.023=6.138$ MHz is assumed. Measuring the error of the auto-regressive model for $K_0=20000$ blocks around the starting angle $$\alpha_0 = \alpha(0) = \frac{45}{180}\pi,$$

a process error level of $$\sigma_w = 0.0003925.$$

is obtained. For each run the algorithm is initialized randomly by $$\tau_0 \sim \mathcal{N}\left(\tau(0), \frac{10 \text{ m}}{c}\right),$$

$$v_0 \sim \mathcal{N}\left(v(0), \frac{50 \text{ m/s}}{c}\right).$$

Figure 13C:
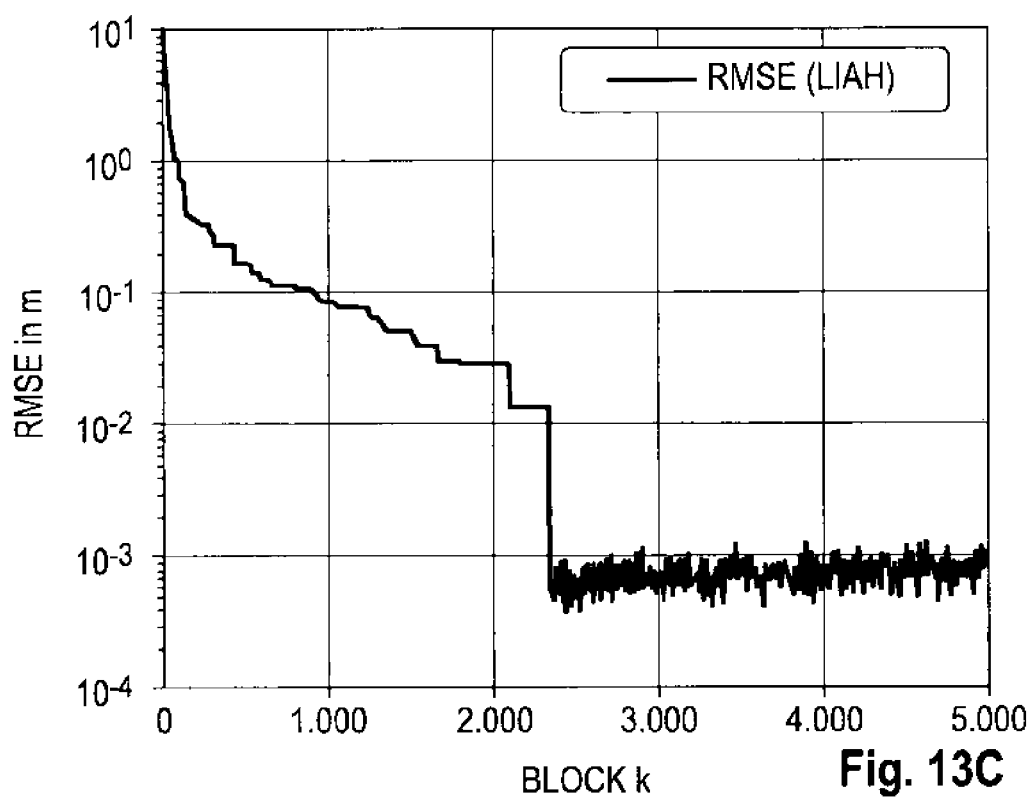
Figure 13D:
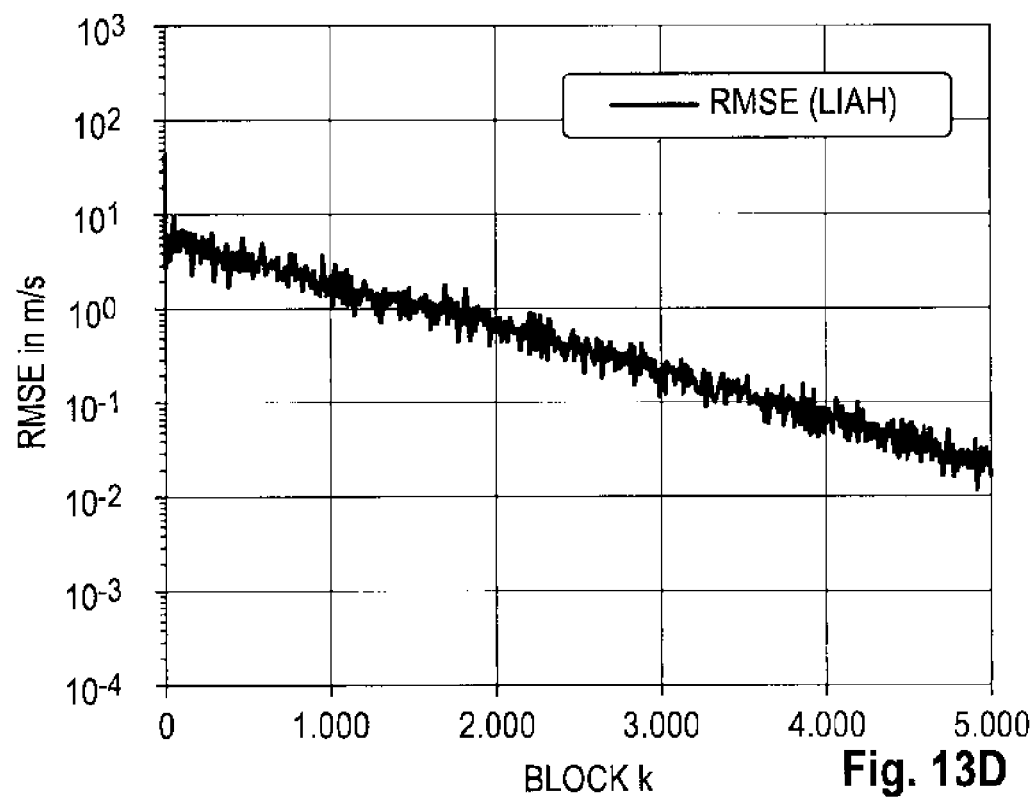

For the alignment algorithm $J=25$ particles and $\rho_P=4$ are used. The histogram has size $A=11$, a shift threshold of $C=10$, an initial width of $$\sigma_H = 9\frac{10 \text{ m}}{\Delta c}$$

modes, a resizing factor of $\rho_H=0.5$ and a low-level initialization factor of $\rho_W=0.33$. For covariance smoothing $\rho_S=0.9975$ is used. FIGS. 13c and 13d visualize the GPS synchronization accuracy of the LIAH algorithm averaged over 100 noise realizations for each of the $K=5000$ blocks in a scenario with a receive power level of SNR=−12 dB. For the considered GPS setup FIG. 13c shows, that after approximately 2 s the LIAH algorithm provides an unambiguous synchronization solution with a root-mean squared error (RMSE) of around 1 mm. The achievable performance with a classical baseband oriented approach is within a RMSE of a few tenth cm. FIG. 13d shows the accuracy of the estimate of the relative velocity of the receiver and the GPS satellite. The LIAH algorithm achieves a velocity RMSE level of a few $$\frac{cm}{s}$$

after approximately 5 s.

CONCLUSION

As described in respect of embodiments of the present invention, unbiased ranging with high precision with one single transmitter is possible in the tracking module of a receiver at moderate complexity. This is achieved by modeling the carrier phase as an exact function of the propagation delay parameter in the statistical model of the receive signal. The ambiguity issue is resolved by means of a tracking based alignment filter and a long integration histogram which assigns probabilities to each ambiguity. In a satellite-based synchronization and positioning application (GPS), the presented approach can outperform prior art ranging methods (DLL/PLL) with respect to the RMSE.

The invention claimed is:

1. A method of determining a distance or location of a remote device or reflector, the method comprising:
   receiving a signal from a remote signal transmitter associated with or contained in or attached to the remote device;
   estimating and tracking a first propagation delay associated with the received signal, wherein the first propagation delay represents a first candidate for a correct propagation delay;
   deriving a relationship between the first candidate and one or more other candidates for a correct propagation delay from the received signal;
   determining a plurality of other candidates for a correct propagation delay based on said relationship;
   generating a likelihood histogram based on said candidates for a correct propagation delay;
   selecting a propagation delay from said candidates based on the likelihood histogram; and
   determining a distance or location of the remote device or reflector using the selected propagation delay.

2. The method of claim 1, wherein said relationship is a distance between neighboring candidates for a correct propagation delay in a grid of said candidates.

3. The method of claim 1, wherein said candidates correspond to local maxima in a likelihood function or distribution.

4. The method of claim 1, further comprising applying a maximum likelihood estimation to the received signal, thereby to determine said first propagation delay.

5. The method of claim 1, further comprising:
   tracking said candidates for a correct propagation delay; and
   updating the likelihood histogram in a predetermined number of iterations or over a predetermined period of time.

6. The method of claim 1, further comprising:
   selecting the first propagation delay by selecting one of a plurality of candidates for a correct propagation delay using particle filtering.

7. The method of claim 6, further comprising uniformly initializing propagation delay particles within a predetermined range of said selected one of said candidates for a correct propagation delay.

8. The method of claim 1, further comprising:
   processing the received signal to generate a plurality of blocks of signal samples; and
   generating the likelihood histogram over subsequent blocks of signal samples.

9. The method of claim 1, wherein the first propagation delay is a time-delay propagation delay.

10. A signal and data processing device comprising:
    a receiver to receive a signal from a remote signal transmitter associated with or contained in or attached to a remote device;
    a signal processing module to convert the received signal into digital data; and
    a data processing module to:
       determine and track a first propagation delay associated with the received signal, wherein the first propagation delay represents a first candidate for a correct propagation delay;
       determine a plurality of other candidates for a correct propagation delay based on a relationship between the first candidate and one or more other candidates for a correct propagation delay;
       generate a likelihood histogram based on said candidates for a correct propagation delay;
       select a propagation delay from said candidates based on the likelihood histogram; and
    determine a distance or location of the remote device using the selected propagation delay.

11. The signal and data processing device of claim 10, comprising a DLL/PLL receiver to perform a propagation delay estimate to determine said first propagation delay.

12. The signal and data processing device of claim 10, wherein the first propagation delay is a time-delay propagation delay.

* * * * *